United States Patent
Ni et al.

(10) Patent No.: US 10,841,848 B2
(45) Date of Patent: Nov. 17, 2020

(54) COMMUNICATION METHOD, USER EQUIPMENT, BASE STATION, CONTROL PLANE NETWORK ELEMENT, AND COMMUNICATIONS SYSTEM

(71) Applicant: HUAWEI TECHNOLOGIES CO., LTD., Shenzhen, Guangdong (CN)

(72) Inventors: Hui Ni, Beijing (CN); Jiao Yang, Xi'an (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/263,962

(22) Filed: Jan. 31, 2019

(65) Prior Publication Data

US 2019/0166532 A1 May 30, 2019

Related U.S. Application Data

(63) Continuation of application No. PCT/CN2016/093217, filed on Aug. 4, 2016.

(51) Int. Cl.
*H04W 4/00* (2018.01)
*H04W 36/08* (2009.01)
(Continued)

(52) U.S. Cl.
CPC .......... *H04W 36/08* (2013.01); *H04W 8/08* (2013.01); *H04W 36/00* (2013.01);
(Continued)

(58) Field of Classification Search
CPC ............ H04W 36/00; H04W 36/0016; H04W 36/0022; H04W 36/08; H04W 56/001;
(Continued)

(56) References Cited

U.S. PATENT DOCUMENTS

2008/0192694 A1  8/2008  Lee et al.
2011/0013589 A1*  1/2011  Wu ................. H04W 36/0055
                                                             370/331
(Continued)

FOREIGN PATENT DOCUMENTS

CN      101453765 A    6/2009
CN      102065429 A    5/2011
(Continued)

OTHER PUBLICATIONS

3GPP TS 36.300, V13.4.0, 3rd Generation Partnership Project; Technical Specification Group, Radio Access Network; Evolved Universal Terrestrial Radio Access (EUTRA) and Evolved Universal Terrestrial Radio Access Network (EUTRAN); Overall description; Stage 2 (Release 13), Jul. 7, 2016, pp. 1-314, XP51123307.
(Continued)

*Primary Examiner* — Minh Trang T Nguyen
(74) *Attorney, Agent, or Firm* — Fish & Richardson P.C.

(57) ABSTRACT

Embodiments of this application provide example communication methods, user equipment, base stations, control plane network elements, and communications systems. One example communication method includes performing, by user equipment (UE), a handover from a first base station to a second base station, where the UE performs communication at the first base station by using a first packet data unit PDU connection via a first forwarding plane network element. The UE can send bearer-less handover indication information to the second base station when performing the handover, where the bearer-less handover indication information is used to instruct the second base station not to establish a connection to the first forwarding plane network element.

10 Claims, 24 Drawing Sheets

(51) Int. Cl.
*H04W 36/00* (2009.01)
*H04W 76/12* (2018.01)
*H04W 76/27* (2018.01)
*H04W 8/08* (2009.01)
*H04W 56/00* (2009.01)
*H04W 80/06* (2009.01)

(52) U.S. Cl.
CPC ... *H04W 36/0016* (2013.01); *H04W 36/0022* (2013.01); *H04W 56/001* (2013.01); *H04W 76/12* (2018.02); *H04W 76/27* (2018.02); *H04W 80/06* (2013.01)

(58) Field of Classification Search
CPC ..... H04W 76/12; H04W 76/27; H04W 80/06; H04W 8/08
See application file for complete search history.

(56) References Cited

U.S. PATENT DOCUMENTS

| | | | |
|---|---|---|---|
| 2012/0164979 A1* | 6/2012 | Bachmann | H04L 63/164 455/411 |
| 2015/0139192 A1 | 5/2015 | Zhang et al. | |
| 2015/0237525 A1* | 8/2015 | Mildh | H04L 47/15 370/230.1 |
| 2016/0044544 A1 | 2/2016 | Yoshizawa et al. | |
| 2016/0309534 A1* | 10/2016 | Teyeb | H04L 69/14 |
| 2017/0034866 A1* | 2/2017 | Wager | H04L 5/0091 |
| 2017/0208104 A1* | 7/2017 | Wei | H04L 69/18 |
| 2017/0339727 A1* | 11/2017 | Barrett | H04L 43/0888 |
| 2018/0103123 A1* | 4/2018 | Skog | H04L 69/14 |
| 2018/0199394 A1* | 7/2018 | Teyeb | H04W 76/16 |
| 2018/0227807 A1* | 8/2018 | Youn | H04W 36/38 |
| 2018/0352484 A1 | 12/2018 | Yoshizawa et al. | |

FOREIGN PATENT DOCUMENTS

| | | |
|---|---|---|
| CN | 104602307 A | 5/2015 |
| CN | 105376814 A | 3/2016 |
| RU | 2414081 C2 | 3/2011 |
| WO | 2015065062 A1 | 5/2015 |
| WO | 2015160329 A1 | 10/2015 |

OTHER PUBLICATIONS

3GPP TS 23.401 V13.6.1, 3rd Generation Partnership Project; Technical Specification Group Services and System Aspects; General Packet Radio Service (GPRS) enhancements for Evolved Universal Terrestrial Radio Access Network (E-UTRAN) access (Release 13), Mar. 24, 2016, pp. 1-365. XP051088382.

Communication Pursuant to Rules 164(1) EPC issued in European Application No. 16911141.6 dated Apr. 1, 2019, 14 pages.

International Search Report and Written Opinion issued in International Application No. PCT/CN2016/093217 dated Apr. 27, 2017, 17 pages.

Office Action issued in Russian Application No. 201905707/07 dated Nov. 21, 2019, 10 pages (with English translation).

* cited by examiner

COMMUNICATION METHOD, USER EQUIPMENT, BASE STATION, CONTROL PLANE NETWORK ELEMENT, AND COMMUNICATIONS SYSTEM

CROSS-REFERENCE TO RELATED APPLICATIONS

This application is a continuation of International Application No. PCT/CN2016/093217, filed on Aug. 4, 2016, the disclosure of which is hereby incorporated by reference in its entirety.

TECHNICAL FIELD

This application relates to the communications field, and more specifically, to a communication method, user equipment, a base station, a control plane network element, and a communications system.

BACKGROUND

An evolved packet system (EPS) includes two parts: an access network and a core network. In a packet core (EPC) architecture in a non-roaming scenario, a radio access network is an evolved universal terrestrial radio access network (E-UTRAN), and can implement functions related to radio access. Key logical network elements of the evolved EPC include a mobility management entity (MME), a serving gateway (S-GW), and a packet data network gateway (P-GW).

In the EPC architecture, an Internet Protocol (IP) address of user equipment (UE) is used by the P-GW to provide a routing function to the outside. Therefore, after the UE moves, an IP address and an uplink/downlink path of a UE service flow need to be anchored at the P-GW, to ensure IP continuity. As a location of the UE moves, the UE needs to perform a handover from a source base station to a target base station. In addition, in a handover process, a packet data network (PDN) connection needs to be established by using the target base station and a gateway corresponding to the source base station. Therefore, after the UE moves, a handover procedure is complex and a delay is relatively high. In addition, a bearer that is set up after the handover is completed is finally wasted. Consequently, quality of user experience is undesirable.

SUMMARY

Embodiments of this application provide a communication method, user equipment, a base station, a control plane network element, and a communications system, so that after UE moves, a handover delay of a service flow can be reduced and a waste of a bearer that is set up after the handover is completed can be avoided.

According to a first aspect, a communication method is provided. The communication method includes:

performing, by user equipment UE, a handover from a first base station to a second base station, where the UE performs communication at the first base station by using a first packet data unit PDU connection via a first forwarding plane network element; and sending, by the UE, bearer-less handover indication information to the second base station when performing the handover, where the bearer-less handover indication information is used to instruct the second base station not to establish a connection to the first forwarding plane network element.

The UE performs the base station handover from the first base station to the second base station, and the UE performs communication by using the first PDU connection when the UE is in a coverage area of the first base station. The first PDU connection is a connection established by the UE by using the first forwarding plane network element and the first base station. The UE sends the bearer-less handover indication information to the second base station in a process of performing the base station handover, so that the second base station does not need to establish the connection to the first forwarding plane network element. Therefore, a handover delay of a service flow and a requirement on network deployment are reduced.

According to a second aspect, this application provides a communication method. The communication method includes:

receiving, by a second base station, bearer-less handover indication information sent by user equipment UE when the UE performs a handover from a first base station to the second base station, where the UE performs communication at the first base station by using a first packet data unit PDU connection via a first forwarding plane network element, and the bearer-less handover indication information is used to instruct the second base station not to establish a connection to the first forwarding plane network element; and determining, by the second base station according to the bearer-less handover indication information, not to establish the connection to the first forwarding plane network element.

When performing the handover from the first base station to the second base station, the UE sends the bearer-less handover indication information to the second base station, and the UE performs communication at a first location (that is, in a coverage area of the first base station) by using the first PDU connection. The first PDU connection is a connection established by the UE by using the first forwarding plane network element and the first base station. The second base station receives the bearer-less handover indication information sent by the UE, and determines that the connection to the first forwarding plane network element does not need to be established, so that a handover delay of a service flow and a requirement on network deployment are reduced.

According to a third aspect, this application provides a communication method. The communication method includes:

obtaining, by user equipment UE, an identity ID of a second base station from a first base station, where the second base station is a base station to which the UE prepares to perform a handover from the first base station; and sending, by the UE, a connection request message to a control plane network element, where the connection request message carries the identity ID of the second base station, so that the control plane network element establishes a packet data unit PDU connection based on the identity ID of the second base station, the PDU connection is a connection between the UE and the second forwarding plane network element, and the second forwarding plane network element is selected by the control plane network element based on the identity ID of the second base station.

The UE establishes a PDU connection (that is, a first PDU connection) to the first base station and a first forwarding plane network element when the UE is at the first base station (that is, in a coverage area of the first base station), so that the UE may perform communication by using the first PDU connection. When the UE needs to move, the UE obtains the identity ID of the second base station in advance, and sends the ID to the control plane network element, so that the control plane network element establishes a second PDU connection between the UE and a second GW based on the ID. This avoids establishment of a connection between the second base station and the first forwarding plane network element in a process in which the UE performs the base station handover, so that a handover delay of a service flow and a requirement on network deployment are reduced.

According to a fourth aspect, this application provides a communication method. The communication method includes:

receiving, by a control plane network element, a packet data unit PDU connection request message sent by user equipment UE, where the PDU connection request message carries an identity ID of a second base station, and the second base station is a base station to which the UE prepares to perform a handover from a currently accessed first base station; and establishing, by the control plane network element, a PDU connection based on the identity ID of the second base station, where the PDU connection is a connection between the UE and the second forwarding plane network element, and the second forwarding plane network element is selected based on the identity ID of the second base station.

When the UE needs to move, the UE obtains the identity ID of the second base station in advance, and sends the PDU connection request message to the control plane network element. In addition, the PDU connection request message carries the ID. The control plane network element receives the identity ID of the second base station, and establishes a second PDU connection based on the ID. This avoids a connection established between the second base station and a first forwarding plane network element after the UE performs the handover to the second base station, so that a handover delay of a service flow and a requirement on network deployment are reduced.

According to an fifth aspect, UE is provided, including a processor and a memory, where the memory stores a program, and the processor executes the program, and is configured to perform the communication method in any one of the first aspect or the possible implementations of the first aspect.

According to a sixth aspect, a base station is provided, including a processor and a memory, where the memory stores a program, and the processor executes the program, and is configured to perform the communication method in any one of the second aspect or the possible implementations of the second aspect.

According to a seventh aspect, UE is provided, including a processor and a memory, where the memory stores a program, and the processor executes the program, and is configured to perform the communication method in any one of the third aspect or the possible implementations of the third aspect.

According to a eighth aspect, a control plane network element is provided, including a processor and a memory, where the memory stores a program, and the processor executes the program, and is configured to perform the communication method in any one of the fourth aspect or the possible implementations of the fourth aspect.

According to a ninth aspect, a computer storage medium is provided, where the computer storage medium stores program code, and the program code is used to indicate an instruction used to perform the communication method in any one of the first aspect or the possible implementations of the first aspect, the communication method in any one of the second aspect or the possible implementations of the second aspect, the communication method in any one of the third aspect or the possible implementations of the third aspect, or the communication method in any one of the fourth aspect or the possible implementations of the fourth aspect.

Based on the foregoing technical solutions, in the embodiments of this application, the UE performs communication by using the first PDU connection via the first forwarding plane network element when the UE is in the coverage area of the first base station, performs a handover from the first base station to the second base station after the UE moves, and sends the bearer-less handover indication information to the second base station when the UE performs the handover, where the bearer-less handover indication information is used to instruct the second base station not to establish the connection to the first forwarding plane network element. Alternatively, the UE obtains the identity ID of the second base station before moving; sends the ID of the second base station to the control plane network element, so that the control plane network element determines the second forwarding plane network element based on the ID; and establishes the PDU connection between the UE and the second forwarding plane network element, so that the second base station can avoid, after the UE moves, establishing the connection to the first forwarding plane network element. Therefore, a handover delay of a service flow is reduced.

BRIEF DESCRIPTION OF DRAWINGS

To describe the technical solutions in the embodiments of this application more clearly, the following briefly describes the accompanying drawings required for describing the embodiments or the prior art. Apparently, the accompanying drawings in the following descriptions show merely some embodiments of this application, and a person of ordinary skill in the art may still derive other drawings from these accompanying drawings without creative efforts.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

This application is described with reference to the embodiments of user equipment and a base station. The user equipment may also be referred to as an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless telephone set, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, and a terminal device in a future 5G network.

The base station may be configured to communicate with a mobile device. The base station may be a base transceiver station (BTS) in a Global System for Mobile Communications (GSM) or in Code Division Multiple Access (CDMA), or may be a NodeB (NB) in Wideband Code Division Multiple Access (WCDMA), or may be an evolved NodeB (eNB or eNodeB) in Long Term Evolution (LTE), or a relay node or an access point, or an in-vehicle device, a wearable device, and a network device in the future 5G network.

Technical solutions in the embodiments of this application may be applied to various communications systems, such as a GSM, a CDMA system, a WCDMA system, a GPRS system, a LTE system, a Universal Mobile Telecommunication System (UMTS), or a Worldwide Interoperability for Microwave Access (WiMAX) communications system.

Figure 1:
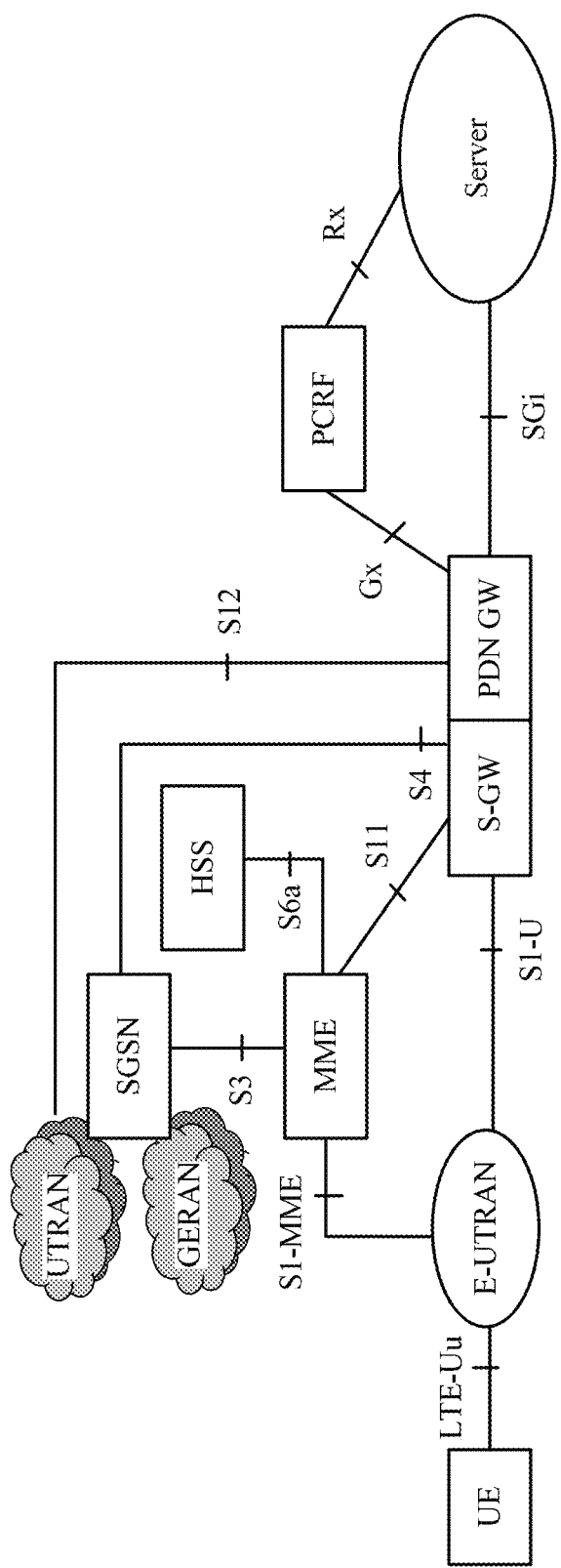
FIG. 1 is a schematic diagram of a network architecture according to an embodiment of this application.

FIG. 1 is a schematic architectural diagram of an evolved packet core EPC system according to an embodiment of this application. The system includes an evolved universal terrestrial radio access network (UTRAN), an access network (GERAN), a serving GPRS support node (SGSN), a home subscriber server (HSS), a policy and charging rules function (PCRF), and a server. The system is applied to a non-roaming scenario, and a radio access network of the system is the evolved universal terrestrial radio access network. Key logical network elements of an evolved packet core include an MME, an S-GW, and a P-GW.

The MME mainly processes a signaling plane function, such as user authentication, a handover, mobility management of a terminal in idle mode, a user context, and bearer management.

The S-GW is a user plane function entity, and may route and forward packet data. In addition, as a data anchor in a 3rd Generation Partnership Project (3GPP) system, the S-GW is configured to terminate an E-UTRAN interface, and is also a local mobility management anchor in an E-UTRAN handover scenario in a geographical area.

The P-GW is a GW connected to an external data network, and is a user plane anchor between a 3GPP access network and a non-3GPP access network. User equipment may establish a packet data network PDN connection by connecting to the P-GW, to access an external PDN. The PDN may be a network, a virtual private network, an IP multimedia service network, or a Wireless Application Protocol network provided by an operator.

During actual network deployment, the logical network elements S-GW and P-GW may be separated or integrated. Except a few cases (such as roaming), the logical network elements S-GW and P-GW are integrated for deployment. The GW in this embodiment of this application may be a general term of the logical network elements S-GW and P-GW.

The Multipath Transmission Control Protocol (MPTCP) is an improved protocol of the Transmission Control Protocol (TCP), and allows one TCP connection to transfer data by using a plurality of paths. For an MPTCP technology, an additional MPTCP sublayer is added to a TCP layer to implement isolation between an application layer and a transport layer. A user may implement multipath transmission and a load balance on an application layer service at the transport layer by dynamically establishing a plurality of subflows.

Same as a conventional TCP connection, an MPTCP connection is also established by using a three-way handshake. A difference is that sent packet fields carry an MP_CAPABLE option. By using the option, whether a remote host supports the MPTCP is determined and information may be exchanged between hosts, for example, to acknowledge establishment of an additional subflow.

A specific procedure of initializing the MPTCP connection is as follows:

1. A host A sends a handshake signal (synchronous, SYN) packet to a peer host B, where the SYN packet carries an MP_CAPABLE option, and the MP_CAPABLE option includes a key of A.

2. The peer host B sends, to the host A, an SYN/acknowledgement (ACK) packet that carries an MP_CAPABLE option, where the MP CAPABLE option includes a key of B.

3. The host A sends, to the peer host B, an ACK packet that carries an MP_CAPABLE option, where the MP_CAPABLE option includes the key of A and the key of B, and a role of the keys is to verify a newly added subflow.

The hosts can obtain IP address information of both parties by exchanging information, and establish a new subflow by using an unused address pair. Theoretically, either party that supports communication can first request to establish a subflow on an existing connection, but it is ideal if a connection establishment requesting end first requests to establish the subflow. The new subflow is established by sending an SYN/ACK packet of the universal TCP, the SYN/ACK packet includes an MP_JOIN option to add a TCP connection, validity of a connection that the new subflow joins is identified by using an authentication code in the MP_CAPABLE option, and an encryption policy is negotiated in a TCP option (MP_JOIN) handshake process.

A specific procedure of establishing an MPTCP subflow is as follows:

1. The host A sends, to the peer host B by using a new address, an SYN packet that carries an MP_JOIN option, where the MP_JOIN option includes a token-B, and a role of the token-B is to notify the host B of an MPTCP session on which a new subflow is to be established.

2. The peer host B sends, to the host A, an SYN/ACK packet that carries the MP_JOIN option, where the MP_JOIN option includes an HMAC-B, and the HMAC-B is authentication information of B.

3. The A sends, to the peer host, an ACK packet that carries the MP_JOIN option, where the MP_JOIN option includes an HMAC-A, and the HMAC-A is authentication information of A.

A transmit end in the standard TCP notifies, by using an identifier (FIN) packet, a receive end that data has been sent, and FIN in the MPTCP has same semantics and a same role. A subflow can be completely disabled only after both a transmit end and a receive end of the subflow mutually acknowledge their FINs. To enable a subflow in the MPTCP to independently work and to be backward compatible with the standard TCP, each FIN affects only a subflow for sending the FIN packet, and the FIN can be used to disable only a specific subflow. When the application layer calls a function close( ) on a socket, it indicates that an application program has no more data to be sent. In this case, an FIN packet is generated in the standard TCP to interrupt a connection, and a DATA_FIN in the MPTCP is used to complete a same function. The DATA_FIN not only may represent that no more data is sent, but also may prove that all data sent before the DATA_FIN is successfully received by the receive end. The DATA_FIN has same semantics and a same behavior as FIN of the standard TCP, but an action scope of the DATA_FIN is at an MPTCP connection level. After the DATA_FIN is sent, an entire MPTCP connection is interrupted. However, the DATA_FIN is acknowledged by using a DATA_ACK only after all data is successfully received. Once one DATA_FIN is acknowledged, all subflows need to be interrupted.

A specific procedure of interrupting an MPTCP connection is as follows:

1. The host A sends a DATA_FIN message to the peer host B.

2. The peer host B sends a DATA_ACK message to the host A.

3. Delete an address.

In a life cycle of the MPTCP connection, if an IP address is suddenly unavailable, a host of the IP address should send a REMOVE_ADDR option to a peer end, to notify the peer end that an IP address is unavailable, so that the unavailable IP address is deleted from the MPTCP connection. After an IP address is deleted, any subflow associated with the IP address is interrupted.

Figure 2:
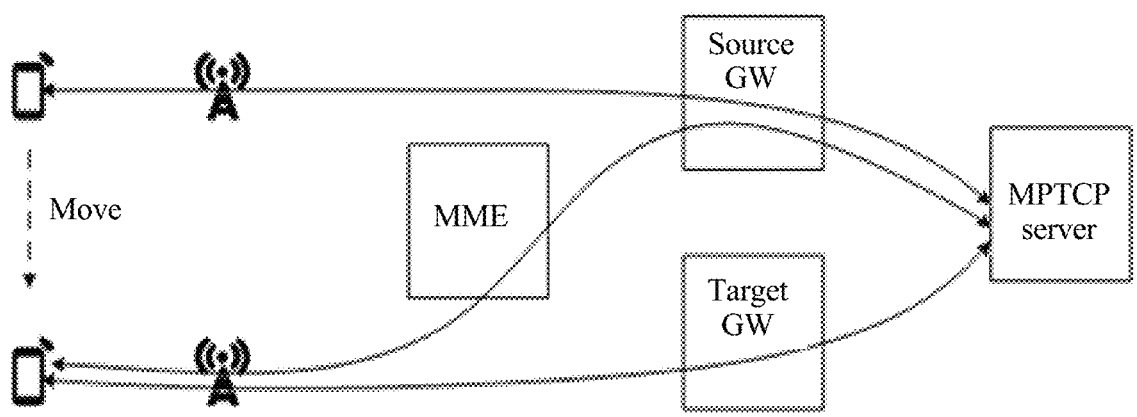
FIG. 2 is a schematic diagram of a handover solution in the prior art.

In the prior art, a solution of handing over a terminal device supporting the MPTCP is shown in FIG. 2. When UE and a server that support the MPTCP need to establish a connection, the UE initiates initialization of the MPTCP connection and establishes an MPTCP subflow 1. Then the UE may perform communication by using the MPTCP subflow 1. An address used by the UE is an address (an IP 1) allocated by a source GW. When the UE moves and arrives in a cell range in which a target base station is located, the UE first performs a base station handover (that is, a handover from a source base station to the target base station) according to an existing handover procedure, establishes a PDN connection between the target base station and the source GW, and performs communication by using an MPTCP subflow 2 between the UE and the server. After the handover, the target base station establishes a new PDN connection by using a target GW, and the target GW allocates a new IP address (an IP 2) to the UE. In this case, the UE has two IP addresses (the IP 1 and the IP 2). The UE establishes an MPTCP subflow 3 by using the IP 2, then disables MPTCP subflow 2 that is based on the IP 1, and finally releases a PDN connection between the UE and the source GW.

Specifically, there are mainly two manners in which the UE performs the base station handover according to the existing handover procedure and establishes the PDN connection between the target base station and the source GW: an X2 interface based handover and an S1 interface based handover.

Figure 3:
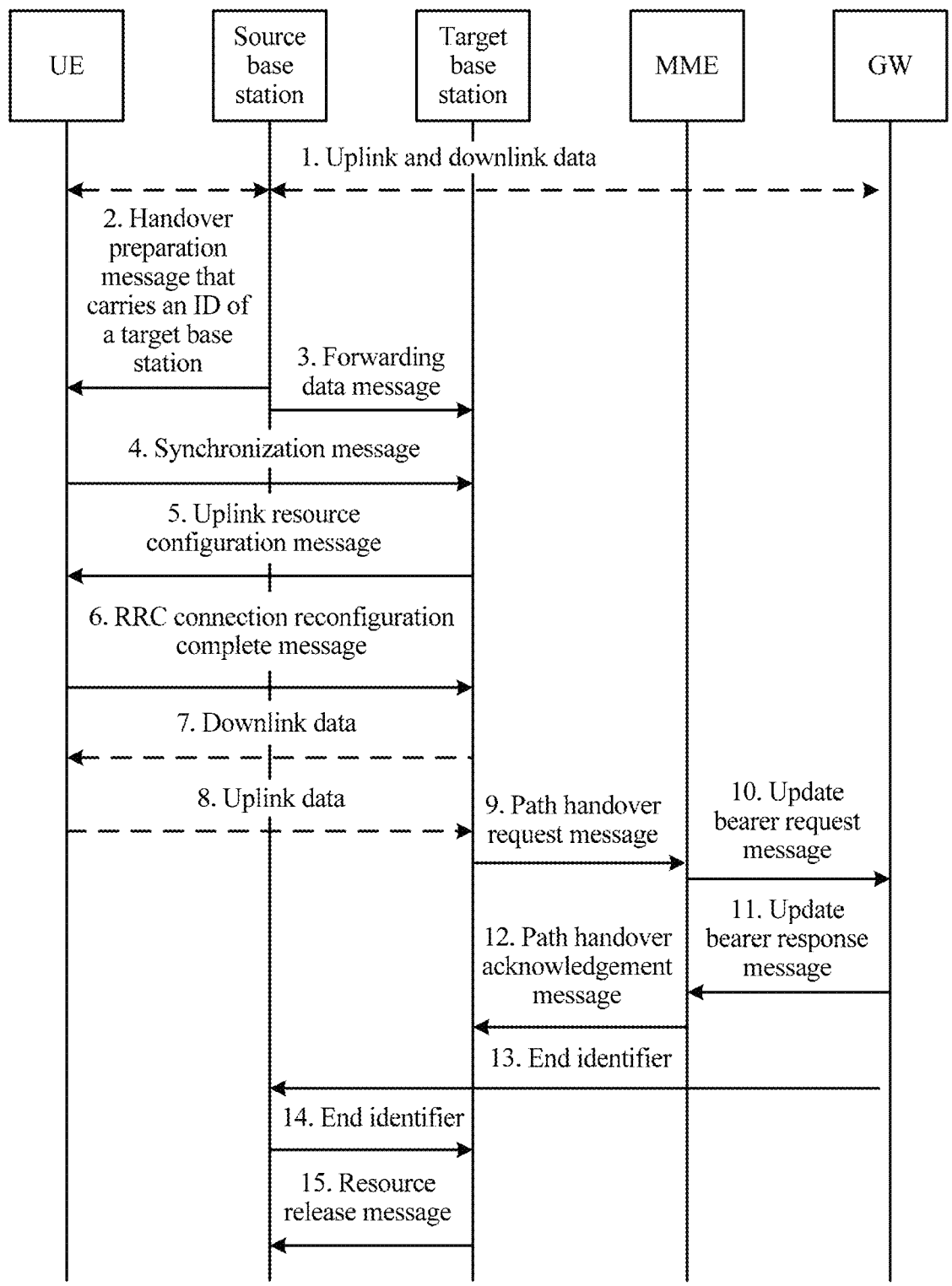
FIG. 3 is a schematic flowchart of an X2 interface based handover according to an embodiment of this application.

An X2 interface is mainly configured to transmit data between eNBs, and the X2 interface is configured to forward the data when a terminal moves from one eNB to another. FIG. 3 shows an X2 interface based handover procedure:

1. UE performs communication by using a PDN connection between a source base station and a GW.

2. The source base station sends a handover preparation message to the UE, where the handover preparation message carries an identity (ID) of a target base station, and the handover preparation message may be a radio resource control protocol (RRC) mobility control message. Specifically, the source base station sends a measurement message to the UE, to instruct the UE to perform detection on a required measurement parameter. The UE performs detection on the measurement parameter according to the measurement message, and reports a measurement report to the source base station. The source base station determines, based on the measurement report, the target base station to which the UE is to be handed over, and sends, to the UE, the RRC mobility control message that carries the ID of the target base station.

3. The source base station sends a forwarding data message to the target base station.

4. The UE sends a synchronization message to the target base station based on the ID of the target base station, to synchronize with the target base station.

5. The target base station returns an uplink resource configuration message to the UE based on the synchronization message.

6. The UE receives the uplink resource configuration message, and sends an RRC connection reconfiguration complete message to the target base station.

7. Optionally, after receiving the RRC connection reconfiguration complete message, the target base station may send downlink data to the UE. Because of a forwarding tunnel between the source base station and the target base station, the downlink data may be sent by a server to the UE through the GW, the source base station, the forwarding tunnel, and the target base station in sequence.

8. Optionally, after receiving the downlink data sent by the target base station, the UE may send uplink data to the target base station.

9. After receiving the RRC connection reconfiguration complete message, the target base station may send a path handover request message to an MME.

10. The MME sends an update bearer request message to the GW based on the path handover request message, to update a bearer.

11. The GW returns an update bearer response message to the MME.

12. The MME sends a path handover acknowledgement message to the target base station based on the update bearer response message.

13. In a process of establishment of a connection between the target base station and the GW, the server may send the downlink data to the source base station by using the GW, and send an end flag after sending the downlink data is completed, to indicate that there is no downlink packet on an original path.

14. The source base station sends the end flag to the target base station.

15. The target base station receives the end flag, and the target base station sends a resource release message to the source base station, where the resource release message is used to release a context of the UE that is on the source base station.

Figure 4A:
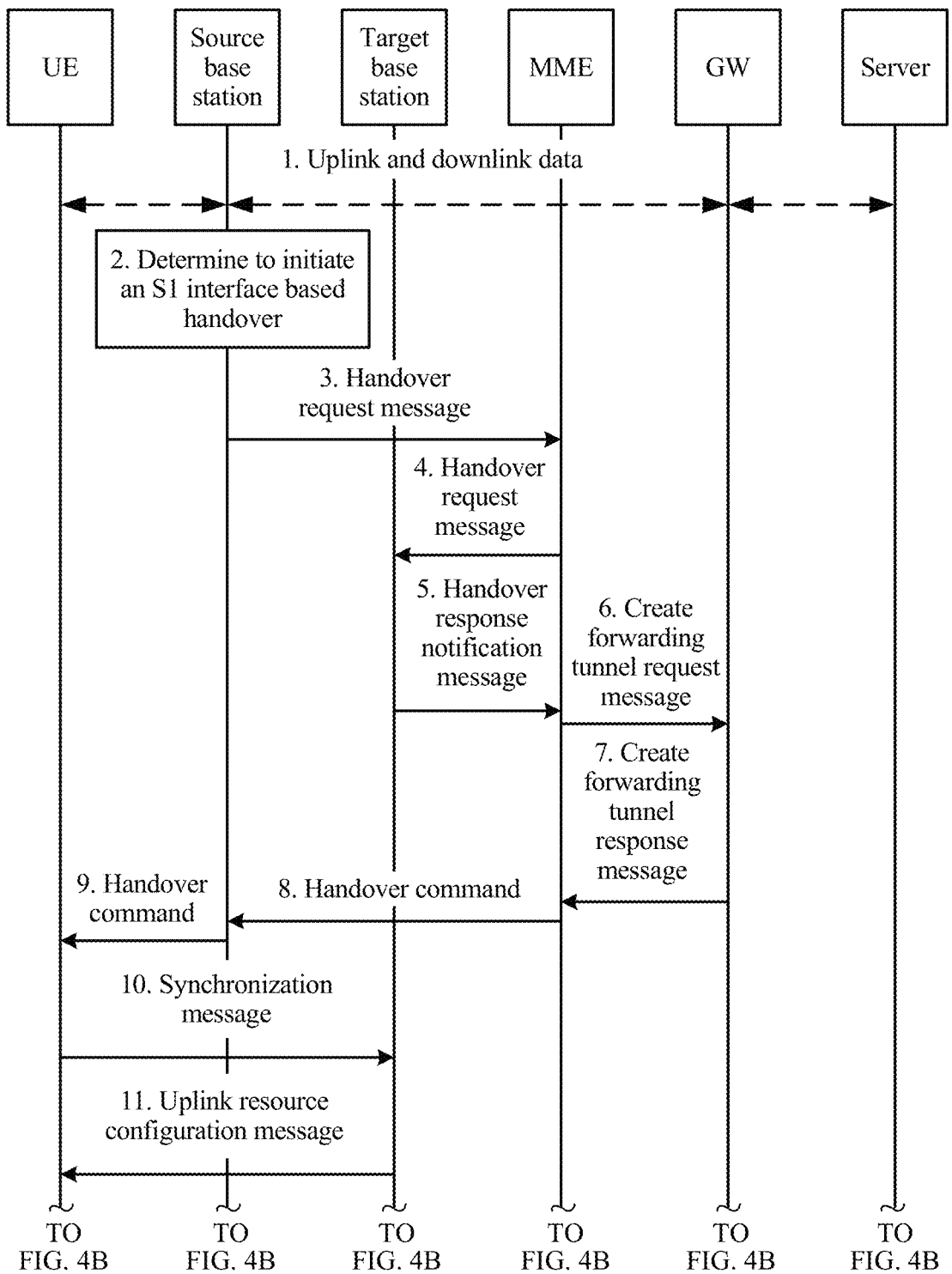
FIG. 4A and FIG. 4B are a schematic flowchart of an S1 interface based handover according to an embodiment of this application.
Figure 4B:
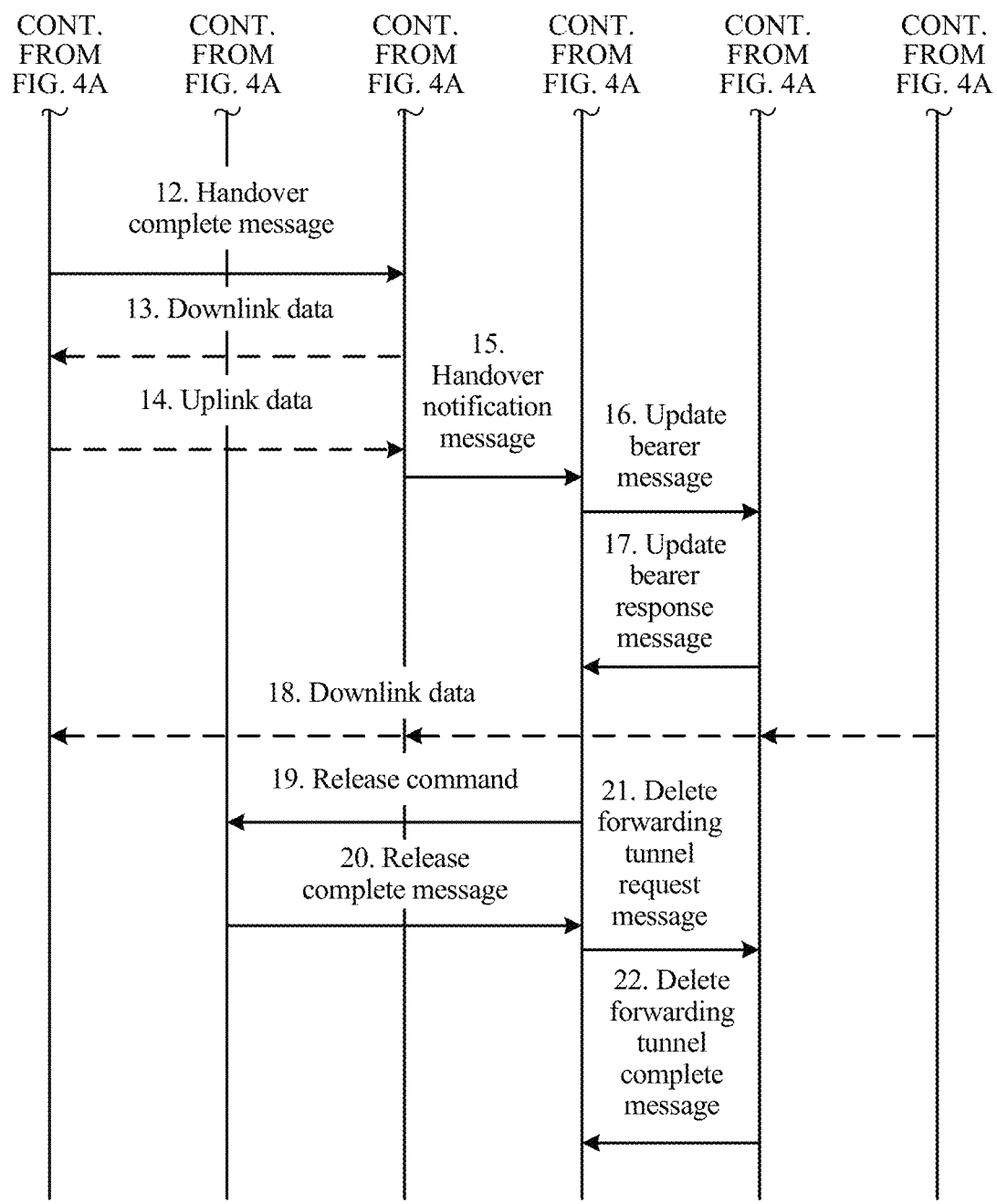

An S1 interface is an interface between an eNB and an MME. FIG. 4A and FIG. 4B show an S1 interface based handover procedure:

1. UE performs communication by using a PDN connection between a source base station and a GW.

2. The source base station determines to initiate an S1 interface based handover, for example, the source base station sends an RRC mobility control message to the UE, where the RRC mobility control message carries an identity ID of a target base station. The source base station sends a measurement message to the UE, to instruct the UE to perform detection on a required measurement parameter. The UE performs detection on the measurement parameter, and reports a measurement report to the source base station. The source base station determines, based on the measurement report, to initiate the S1 interface based handover.

3. The source base station sends a handover request message to the MME, where the handover request message is used to request to perform a handover to the target base station.

4. The MME sends the handover request message to the target base station, where the handover request message is used by the target base station to create a context of the UE.

5. The target base station sends a handover response notification message to the MME.

6. The MME sends a create forwarding tunnel request message to the GW, where the create forwarding tunnel request message is used to create a forwarding tunnel to implement indirect forwarding.

7. The GW sends a create forwarding tunnel response message to the MME, where the forwarding tunnel may implement that the server communicates with the UE through the GW, the source base station, the GW, and the target base station in sequence.

8. The MME sends a handover command to the source base station, where the handover command is used by the UE to perform the base station handover.

9. The source base station sends the handover command to the UE.

10. The UE sends a synchronization message to the target base station based on the handover command, to synchronize with the target base station.

11. The target base station returns an uplink resource configuration message to the UE based on the synchronization message.

12. The UE sends a handover complete message to the target base station based on the uplink resource configuration message.

It should be noted that the UE further sends an RRC connection reconfiguration complete message to the target base station before sending the handover complete message. Details are not described herein.

13. Optionally, after receiving the handover complete message, the target base station may send downlink data to the UE, where the downlink data may be sent by the source base station to a source gateway and then to the target base station through the forwarding tunnel.

14. Optionally, the UE may further send uplink data to the target base station.

15. The target base station may send a handover notification message to the MME after receiving the handover complete message.

16. Because of the base station handover, the MME sends an update bearer request message to the GW, to update a bearer.

17. The GW returns an update bearer response message to the MME.

18. Optionally, the server may send the downlink data to the UE by using the GW and the target base station.

19. The MME instructs, based on the update bearer response message, the source base station to release a context of the UE that is on the source base station.

20. The source base station returns a release complete message to the MME.

21. The MME sends a delete forwarding tunnel request message to the GW.

22. The GW returns a delete forwarding tunnel complete message to the MME.

A PDN connection is an IP connection provided by an EPS system between the UE and an external packet network PDN. A PDN connection service may support transmission of one or more service data flows.

Figure 5:
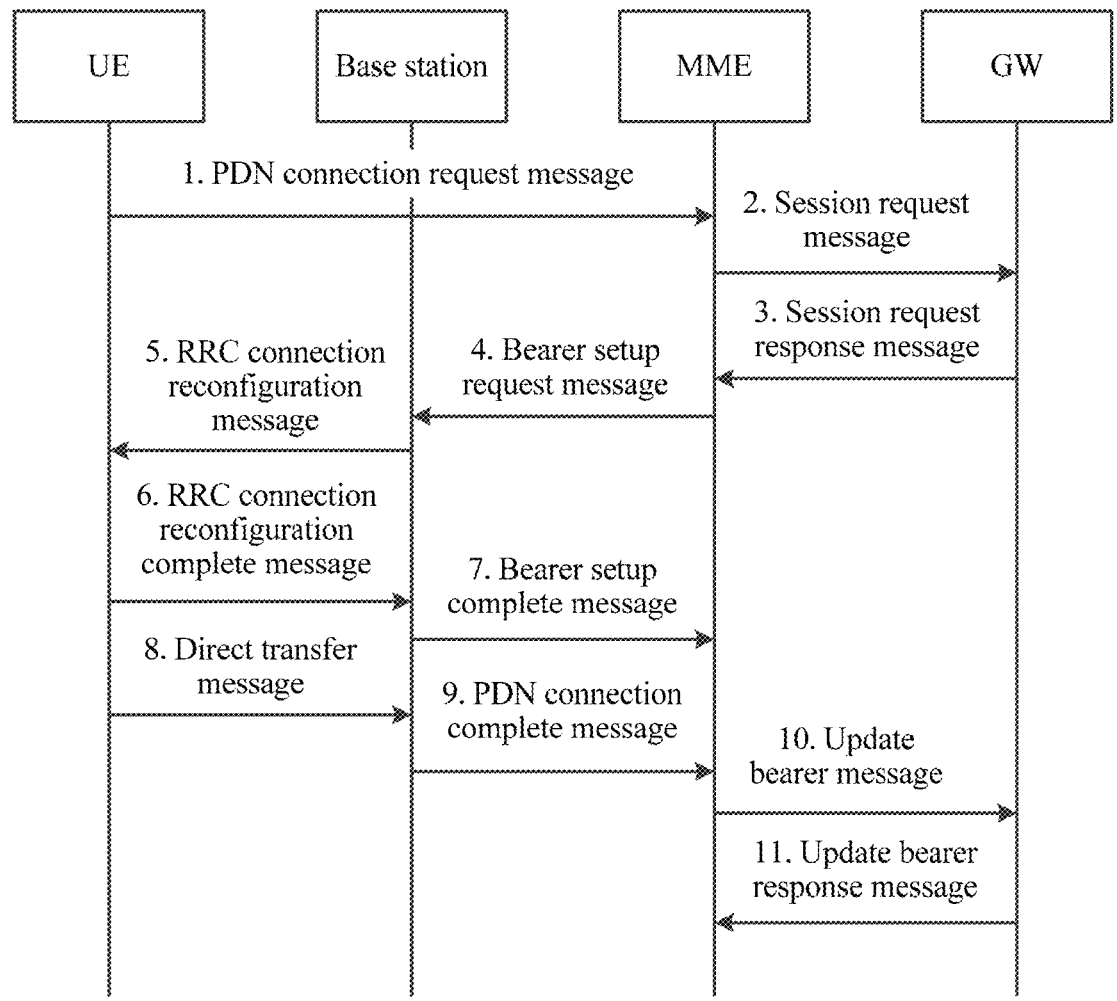
FIG. 5 is a schematic flowchart of establishing a PDN connection according to an embodiment of this application.

FIG. 5 shows a detailed procedure of establishing a PDN connection:

1. UE sends a PDN connection request message to an MME.
2. The MME sends a session request message to a GW, where the session request message is used to request to create a default bearer.
3. The GW returns a session request response message to the MME, to indicate that creating the default bearer is already completed.
4. The MME sends a bearer setup request message to a base station, where the bearer setup request message is used to request to set up an S1 bearer.
5. The base station sends a RRC connection reconfiguration message to the UE.
6. The UE sends an RRC connection reconfiguration complete message to the base station.
7. The base station sends a bearer setup complete message to the MME.
8. The UE constructs, at a non-access stratum (NAS), a PDN connection complete message having an EPS bearer identifier, and sends the PDN connection complete message to the base station by using a direct transfer message.
9. The base station sends the PDN connection complete message to the MME.
10. The MME sends an update bearer message to the GW.
11. The GW sends an update bearer response message to the MME, and starts to send a temporarily stored downlink data packet.

Figure 6:
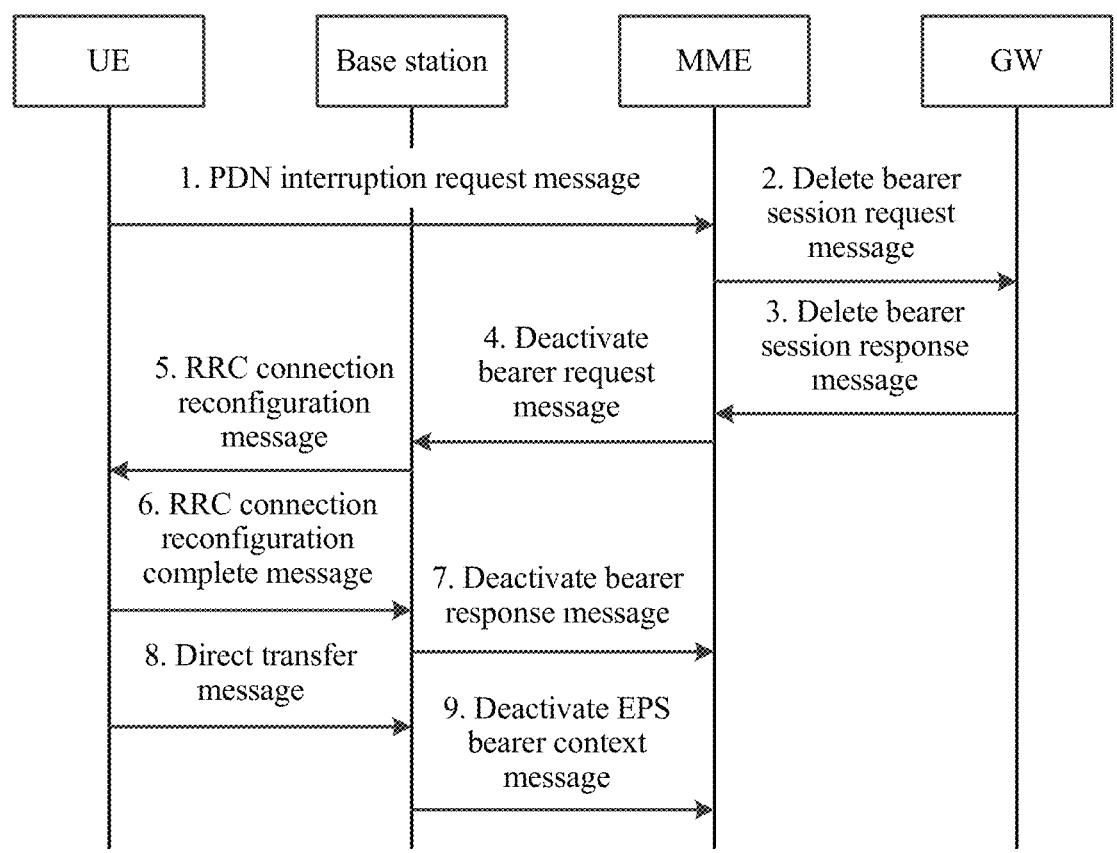
FIG. 6 is a schematic flowchart of releasing a PDN connection according to an embodiment of this application.

As shown in FIG. 6, a process of releasing a PDN connection is as follows:

1. UE sends a PDN interruption request message to an MME.
2. The MME sends a delete bearer session request message to a GW.
3. The GW sends a delete bearer session response message to the MME.
4. The MME sends a deactivate bearer request message to a base station.
5. The base station sends an RRC connection reconfiguration message to the UE.
6. The UE sends an RRC connection reconfiguration complete message to the base station.
7. The base station sends a deactivate bearer response message to the MME.
8. The UE constructs a deactivate EPS bearer context message at a NAS stratum, and sends the deactivate EPS bearer context message to the base station.
9. The base station sends the deactivate EPS bearer context message to the MME.

Therefore, in the prior art, data transmission of a source-side PDN connection after a base station handover depends on a bearer between a source-side base station/GW and a target-side base station/GW. Consequently, interconnection deployment needs to be implemented between the base station and a peripheral GW, and network planning is complex. In addition, a target-side PDN connection needs to be established after the handover is completed. Consequently, a handover delay of a data path is relatively high.

It should be understood that in this embodiment of this application, a peer end communicating with the UE may be a server or a data network. For ease of description, the server is used as an example in this embodiment of this application for description. However, this is not limited in this application.

It should be further understood that in this embodiment of this application, the PDN, the GW, and the MME are names in an LTE network architecture, and respectively correspond to a packet data unit (PDU), a forwarding plane network element, and a control plane network element that are in another network. For ease of description, a PDU connection, the forwarding plane network element, and the control plane network element are used as an example in this embodiment of this application for description. However, this is not limited in this application.

Figure 7:
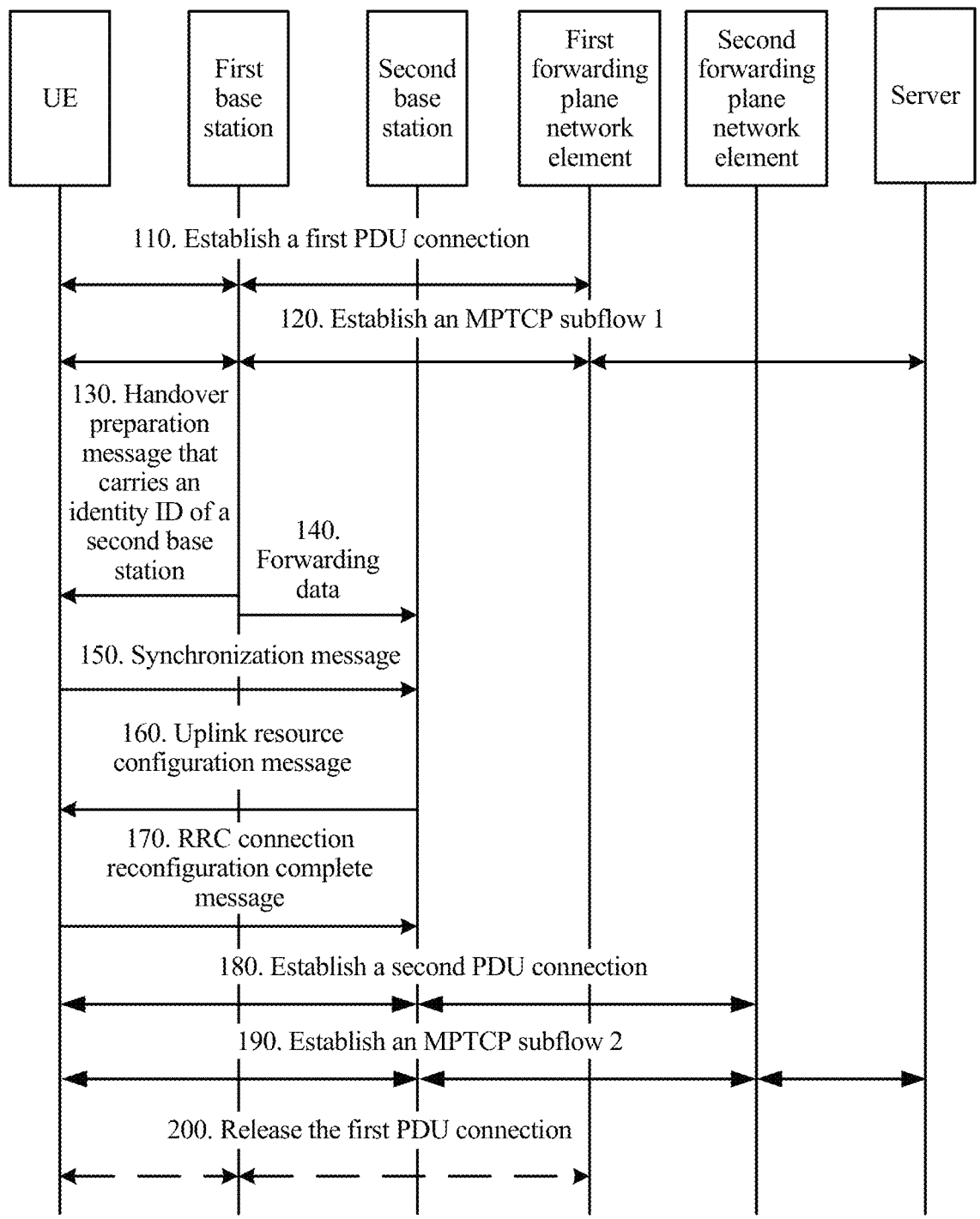
FIG. 7 is an interaction flowchart of a communication method according to an embodiment of this application.

FIG. 7 is an interaction flowchart of a communication method according to an embodiment of this application. It should be noted that this embodiment is merely provided to help a person skilled in the art better understand embodiments of this application, instead of limiting the scope of the embodiments of this application.

110: When UE is at a first location, the UE establishes a first PDU connection to a first forwarding plane network element by using a first base station.

The first location may be any location in a coverage area of the first base station. The UE establishes, by using the first base station, the first PDU connection to the first forwarding plane network element corresponding to the first base station, and an IP address allocated by the first forwarding plane network element to the UE is an IP 1. Specifically, the UE sends a PDU connection request to a control plane network element by using the first base station, and the control plane network element finds the first forwarding plane network element by using the first base station, so that the UE establishes the first PDU connection to the first forwarding plane network element by using the first base station. Specifically, a PDU connection process is shown in FIG. 5. To avoid repetition, details are not described herein.

120: The UE initiates initialization of an MPTCP connection, to a server by using the first base station and the first forwarding plane network element based on the IP 1, and establishes an MPTCP subflow 1. Therefore, the UE may perform communication by using the MPTCP subflow 1. For a specific procedure in which the UE initiates initialization of the MPTCP connection based on the IP 1, refer to the foregoing description. To avoid repetition, details are not described herein again.

It should be noted that the UE and the server may be user terminals that can both support the MPTCP. It should be further understood that the subflow may be further a connection of the TCP supported by both the UE and the server, a subflow of another improved protocol, or the like. An MPTCP subflow is used as an example in this embodiment of this application for description. However, this application is not limited thereto.

130: When the UE moves from the first location to a second location, the UE receives a handover preparation message sent by the first base station, where the handover preparation message carries an identity ID of a second base station.

When the UE moves to the second location (the second location is any location in a coverage area of the second base station), the UE performs a handover from the first base station to the second base station. In this embodiment of this application, the UE performs the handover based on an X2 interface. First, the UE receives the handover preparation message sent by the first base station. For example, the handover preparation message may be an RRC mobility control message.

It should be understood that before the UE receives the handover preparation message, the first base station sends a measurement message to the UE, to instruct the UE to perform detection on a required measurement parameter. The UE performs detection on the measurement parameter according to the measurement message, and reports a measurement report to the first base station. The first base station determines, based on the measurement report, a target base station to which the UE is to be handed over, and sends, to the UE, the RRC mobility control message carrying the identity ID of the second base station.

140: When the UE moves to the second location, the server sends downlink data (that is, forwarding data) to the second base station by using the first forwarding plane network element and the first base station in sequence, where the first base station may send the forwarding data to the second base station through a first forwarding tunnel.

Alternatively, this step and step 130 may be simultaneously performed. Alternatively, this step is performed after step 130. This is not limited in this application.

150: The UE sends a synchronization message to the second base station based on the identity ID of the second base station, to maintain synchronization between the UE and the second base station.

160: The second base station receives the synchronization message, and returns an uplink resource configuration message to the UE.

170: The UE receives the uplink resource configuration message, and sends an RRC connection reconfiguration complete message to the second base station, where the connection reconfiguration complete message is used to indicate that the UE has completed a resource configuration, and the RRC connection reconfiguration complete message carries bearer-less handover indication information.

In the prior art, after the UE accesses the second base station, the UE establishes the PDU connection by using the second base station and the first forwarding plane network element. In contrast, in this embodiment of this application, in a process of performing the handover from the first base station to the second base station by the UE, the connection reconfiguration complete message sent to the second base station by the UE carries the bearer-less handover indication information, and the bearer-less handover indication information is used to indicate that the second base station does not need to initiate the PDU connection to the first forwarding plane network element, so that interconnection deployment does not need to be implemented between the second base station and a peripheral forwarding plane network element. This reduces network planning complexity and a handover delay of a service flow path.

It should be understood that the bearer-less handover indication information may be carried in the RRC connection reconfiguration complete message. Different from the prior art, in FIG. 3, the bearer-less handover indication information may be alternatively carried in another message before step 170, such as the synchronization message or another message that is not displayed. Alternatively, the bearer-less handover indication information may be independently sent. This is not limited in this application.

Optionally, after accessing the second base station, the UE may receive downlink data sent by the second base station. The downlink data may be sent by the server by using the first forwarding plane network element, the first base station, and the second base station in sequence in the base station handover process. The first base station is connected to the second base station by using the first forwarding tunnel.

180: After completing the base station handover, the UE establishes a second PDU connection.

After completing the base station handover, the UE may establish the second PDU connection to the second base station and a second forwarding plane network element, and the second forwarding plane network element allocates an IP address to the UE.

190: The UE establishes, based on the second PDU connection, a second MPTCP subflow for communication.

The UE establishes an MPTCP subflow 2 to the server based on an IP address (an IP 2) allocated by the second forwarding plane network element, by using the second base station and the second forwarding plane network element. For example, the UE establishes the MPTCP subflow 2 to a peer server by using the IP 2 by sending an SYN/ACK packet of the universal TCP, and the SYN/ACK packet includes an MP_JOIN option to add a TCP connection. Specifically, a process of establishing an MPTCP subflow is the same as the process of establishing an MPTCP subflow described above. Details are not described herein again. Therefore, the UE may perform communication by using the MPTCP subflow 2.

Optionally, if the server supports an interface having a plurality of IP addresses, the server may send address information including the plurality of IP addresses of the interface of the server to the UE when sending the downlink data to the UE. When initiating a new PDU connection, the UE may choose to be connected to an IP address of the interface of the server closest to the UE.

200: The UE releases the first PDU connection when a preset moment expires.

In the process in which the UE performs the base station handover, the server may send the downlink data to the second base station through the first forwarding tunnel; and after the base station handover, may send the downlink data to the UE, so that the UE receives the downlink data.

After the UE communicates with the server by using the MPTCP subflow 2, a timer is triggered. To ensure that all the downlink data can be sent to a greatest extent in the base station handover process and in a process of establishing the second PDU session, the UE releases the first PDU connection when the timer expires at the preset moment.

For example, the UE adds a REMOVR_ADDR option to a packet transmitted on the MPTCP subflow 2, to instruct the peer server to delete the old address IP 1, and triggers the timer, to ensure that a packet already existing on the MPTCP subflow 1 is sent to the UE. A specific process of releasing the PDU connection is shown in FIG. 6. Details are not described herein again in this embodiment of this application.

In addition, presetting the timer can prevent a loss of a packet that is sent by the server to a source path and that is of the first PDU connection.

Figure 8:
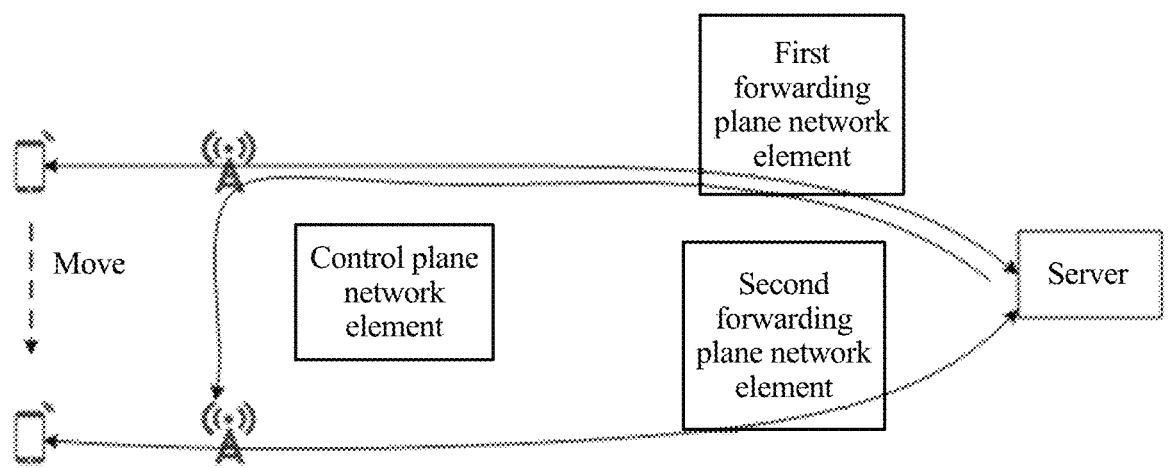
FIG. 8 is a model architectural diagram of a communication method according to an embodiment of this application.

To sum up, as shown in FIG. 8, according to the communication method in this embodiment of this application, after the UE moves, a connection does not need to be established between the second base station and the first forwarding plane network element, and the downlink data may be sent through the first forwarding tunnel. After establishing the second PDU connection by using the second base station and the second forwarding plane network element, the UE establishes, based on the second PDU connection, the MPTCP subflow for communication, triggers the timer, and releases the first PDU connection when the preset moment expires.

Therefore, according to the communication method in this embodiment of this application, when the UE is in the coverage area of the first base station, the UE performs communication by using the first PDU connection via the first forwarding plane network element. After the UE moves, the UE performs the handover from the first base station to the second base station. When performing the handover, the UE sends the bearer-less handover indication information to the second base station, and the bearer-less handover indication information is used to instruct the second base station not to establish the connection to the first forwarding plane network element, so that the second base station can avoid, after the UE moves, establishing the connection to the first forwarding plane network element. Therefore, a handover delay of a service flow is reduced.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

Figure 9A:
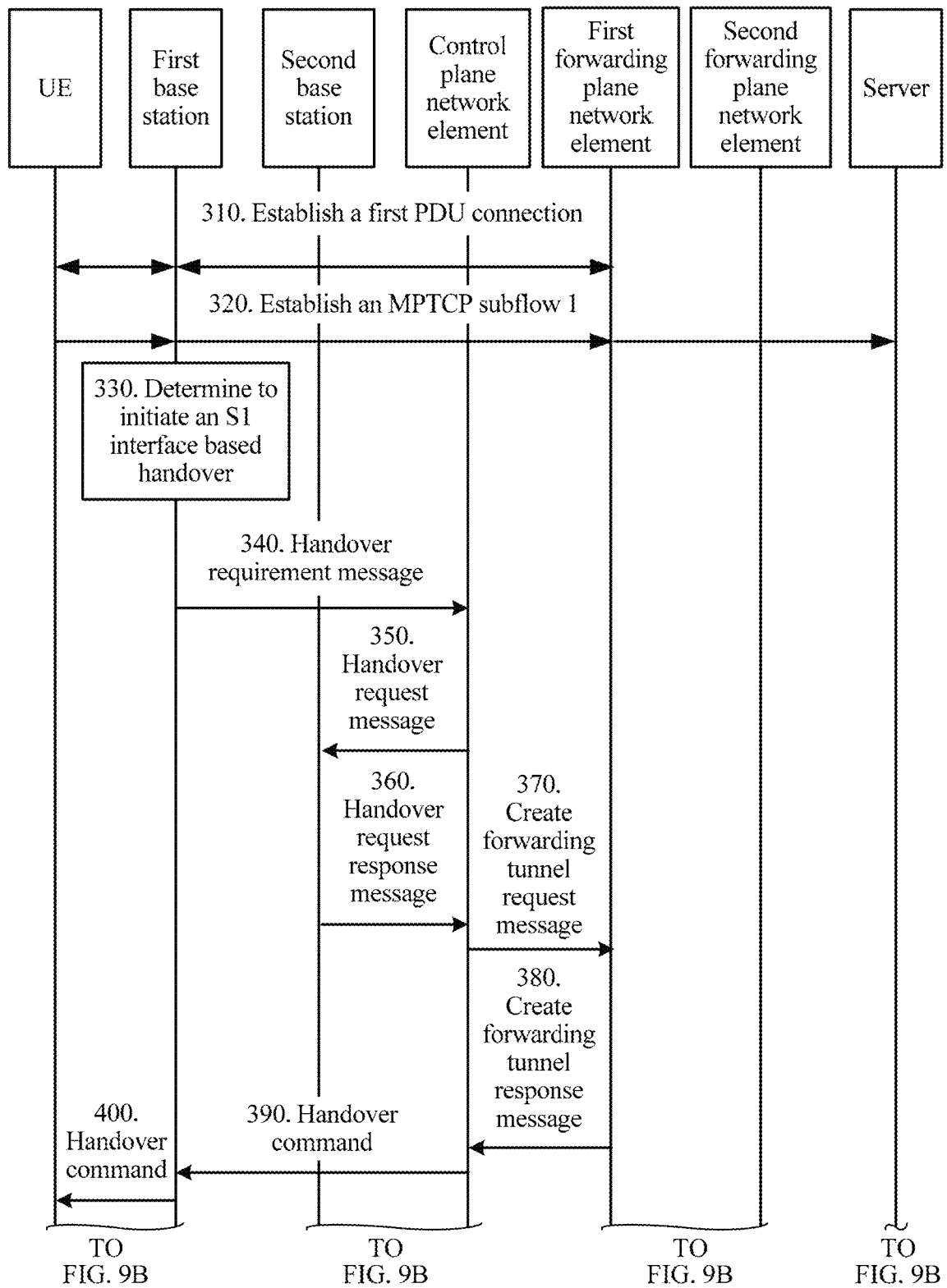
FIG. 9A and FIG. 9B are an interaction flowchart of a communication method according to another embodiment of this application.
Figure 9B:
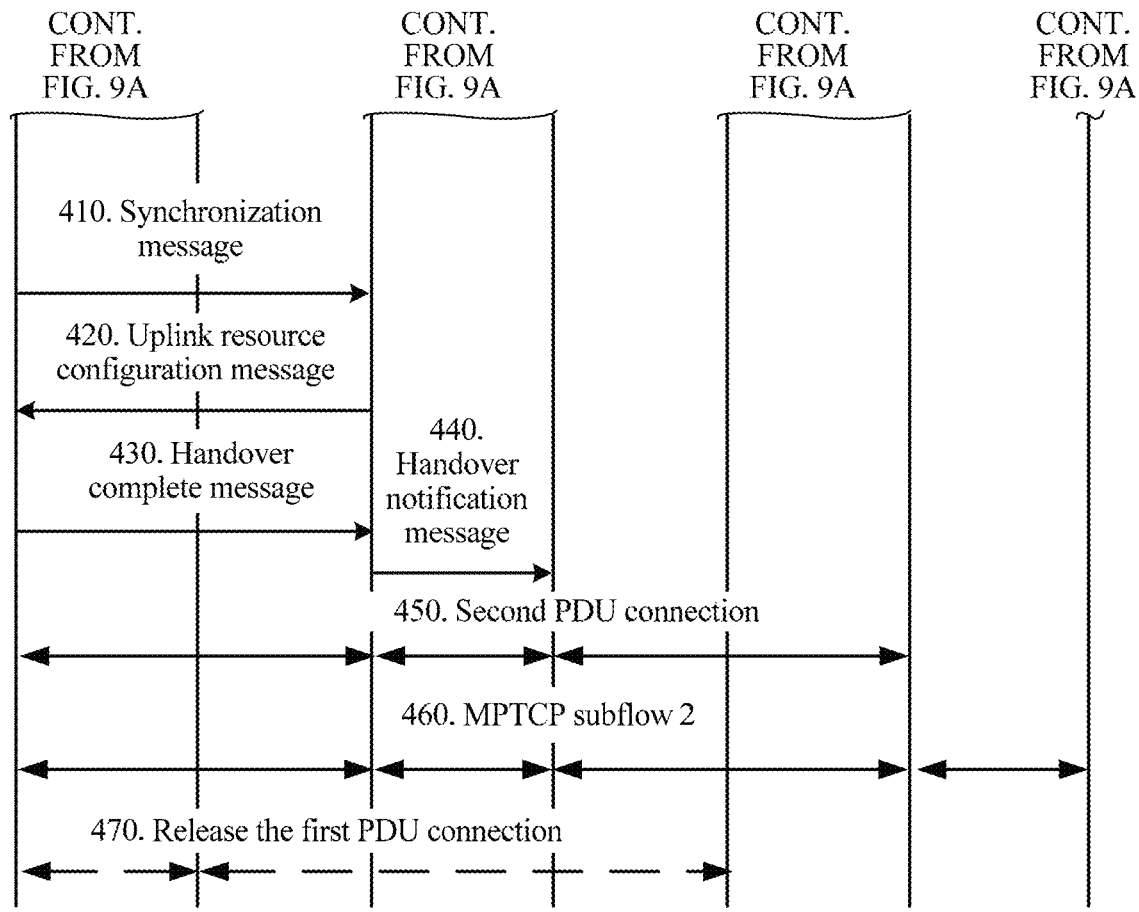

FIG. 9A and FIG. 9B are an interaction flowchart of a communication method according to another embodiment of this application. Meanings of terms in this embodiment of this application are the same as those in the foregoing embodiments.

310: When UE is at a first location, the UE establishes a first PDU connection to a first forwarding plane network element by using a first base station, so that the UE performs communication by using the first base station and the first forwarding plane network element.

The first location may be any location in a coverage area of the first base station. The UE establishes the first PDU connection to the first forwarding plane network element by using the first base station when the UE is in the coverage area of the first base station, and an IP address allocated by the first forwarding plane network element to the UE is an IP 1. Specifically, the UE sends a PDU connection request to a control plane network element by using the first base station, and the control plane network element finds the first forwarding plane network element by using the first base station, so that the UE establishes the first PDU connection to the first forwarding plane network element by using the first base station. Specifically, for a PDU connection process, refer to FIG. 5. Details are not described herein.

320: The UE initiates, to a server based on the IP 1, initialization of an MPTCP connection by using the first base station and the first forwarding plane network element, and establishes an MPTCP subflow 1. Therefore, the UE may perform communication by using the MPTCP subflow 1. For a specific procedure in which the UE initiates initialization of the MPTCP connection based on the IP 1, refer to the foregoing description. To avoid repetition, details are not described herein again.

It should be noted that the UE and the server may be user terminals that can both support the MPTCP. It should be further understood that the subflow may be further a connection of the TCP supported by both the UE and the server, a subflow of another improved protocol, or the like. An MPTCP subflow is used as an example in this embodiment of this application for description. However, this application is not limited thereto.

330: When the UE moves from the first location to a second location, the first base station determines to initiate an S1 interface based handover.

Specifically, the second location may be any location in a coverage area of a second base station, and the first base station sends a measurement message to the UE, to instruct the UE to perform detection on a required measurement parameter. The UE performs detection on the measurement parameter according to the measurement message, and reports a measurement report to the first base station. The first base station determines, based on the measurement report, to initiate the S1 interface based handover.

340: The first base station sends a handover requirement message to the control plane network element.

350: The control plane network element sends a handover request message to the second base station based on the handover requirement message.

360: The second base station sends a handover request response message to the control plane network element.

370: The control plane network element receives the handover request response message, and sends a create forwarding tunnel request message to the first forwarding plane network element, to establish a second forwarding tunnel between the first forwarding plane network element and the second base station.

380: The first forwarding plane network element returns a create forwarding tunnel response message to the control plane network element, to indicate completion of establishment of the second forwarding tunnel.

390: The control plane network element sends a base station handover command to the first base station, and sends the base station handover command to the UE by using the first base station.

400: The first base station sends the base station handover command to the UE, to instruct the UE to perform a base station handover.

410: The UE sends a synchronization message to the second base station, to maintain synchronization between the UE and the second base station.

420: The second base station receives the synchronization message, and sends an uplink resource configuration message to the UE.

430: The UE receives the uplink resource configuration message, and sends a handover complete message to the second base station, where the handover complete message is used to indicate that the UE has completed the base station handover, and the handover complete message carries bearer-less handover indication information.

When the UE moves from the first location to the second location, an IP address and an uplink/downlink path of a UE service flow need to be anchored at a forwarding plane network element, to ensure IP continuity. Therefore, after accessing the second base station, the UE further establishes a PDU connection by using the second base station and the first forwarding plane network element. In this embodiment of this application, when performing the handover from the first base station to the second base station, the UE sends, to the second base station, the handover complete message that carries the bearer-less handover indication information, and the bearer-less handover indication information is used to indicate that the second base station does not need to initiate the PDU connection to the first forwarding plane network element, so that interconnection deployment does not need to be implemented between the second base station and a peripheral forwarding plane network element. This reduces network planning complexity and a handover delay of a data path.

It should be understood that the bearer-less handover indication information may be alternatively carried in an RRC connection reconfiguration complete message. Different from the prior art, in FIG. 4A and FIG. 4B, the bearer-less handover indication information may be alternatively carried in another message before the handover complete message, such as the synchronization message or another message that is not displayed. Alternatively, the bearer-less handover indication information may be independently sent. This is not limited in this application.

440: After receiving the handover complete message, the second base station sends a handover notification message to the control plane network element, to notify the control plane network element that the UE has completed the base station handover.

It should be understood that the UE may further send the RRC connection reconfiguration complete message to the second base station based on the uplink resource configuration message. This is not limited in this application. It should be further understood that the bearer-less handover indication information may be alternatively carried in the RRC connection reconfiguration complete message. This is not limited in this application.

Optionally, after completing the base station handover, the UE may receive downlink data sent by the second base station. The UE receives the downlink data sent by the second base station. The downlink data is sent by the server to the UE by using the first forwarding plane network element, the first base station, the first forwarding plane network element, and the second base station in sequence in a base station handover process.

450: After completing the base station handover, the UE establishes a second PDU connection.

After completing the base station handover, the UE may establish the second PDU connection by using the second base station and a second forwarding plane network element, and the second forwarding plane network element allocates an address IP 2 to the UE.

460: The UE establishes, based on the second PDU connection, a second MPTCP subflow for communication.

The UE establishes an MPTCP subflow 2 to the server based on the address IP 2 by using the second base station and the second forwarding plane network element. Specifically, a process of initiating an MPTCP subflow is the same as the process of establishing an MPTCP subflow described above. Details are not described herein again. Therefore, the UE performs communication by using the MPTCP subflow 2.

Optionally, if the server supports an interface having a plurality of IP addresses, the server may send address information including the plurality of IP addresses of the interface of the server to the UE when sending the downlink data to the UE. When initiating a new PDU connection, the UE may choose to be connected to an IP address of the interface of the server closest to the UE.

470: The UE releases the first PDU connection when a preset moment expires.

In the process in which the UE performs the base station handover, the server may send the downlink data to the second base station by using the first forwarding plane network element, the first base station, and the first forwarding plane network element in sequence. After accessing the second base station, the UE may send the downlink data to the UE. Therefore, to ensure that all the downlink data can be sent to a greatest extent in the handover process, the UE releases the first PDU connection when the preset moment expires. In this way, presetting the timer can prevent a loss of a packet that is sent by the server to a source path and that is of the first PDU connection.

For example, the UE adds a REMOVR_ADDR option to a packet transmitted on the MPTCP subflow 2, to instruct a peer server to delete the old address IP 1, and triggers the timer. This ensures that a packet already existing on the MPTCP subflow 1 may be sent to the UE. For a specific process of releasing the PDU connection, refer to FIG. 6. Details are not described herein again in this embodiment of this application.

Figure 10:
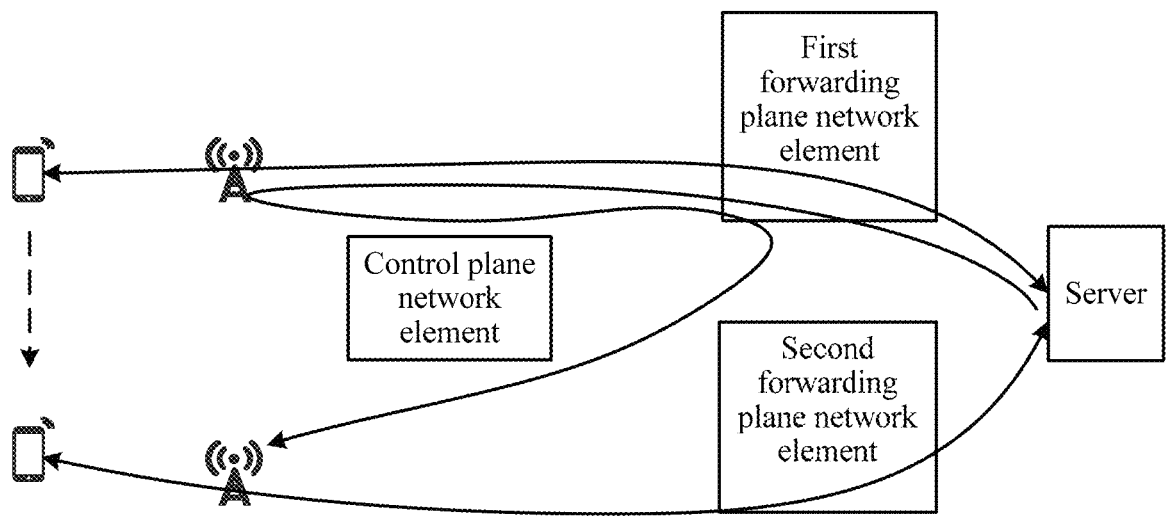
FIG. 10 is a model architectural diagram of a communication method according to another embodiment of this application.

To sum up, as shown in FIG. 10, according to the communication method in this embodiment of this application, after the UE moves, a connection does not need to be established between the second base station and the first forwarding plane network element, and the downlink data may be sent through the second forwarding tunnel. After establishing the second PDU connection by using the second base station and the second forwarding plane network element, the UE establishes, based on the second PDU connection, the MPTCP subflow for communication, triggers the timer, and releases the first PDU connection when the preset moment expires.

It should be understood that reference may be made to the foregoing embodiments for a specific manner for indicating the foregoing corresponding information. For brevity, details are not described herein again.

Therefore, according to the communication method provided in this embodiment of this application, when the UE is in the coverage area of the first base station, the UE performs communication by using the first PDU connection via the first forwarding plane network element. After the UE moves, the UE performs the handover from the first base station to the second base station. When performing the handover from the first base station to the second base station, the UE sends the bearer-less handover indication information to the second base station, and the bearer-less handover indication information is used to instruct the second base station not to establish the connection to the first forwarding plane network element, so that the second base station can avoid, after the UE moves, establishing the connection to the first forwarding plane network element. Therefore, a handover delay of a service flow is reduced.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

Figure 11:
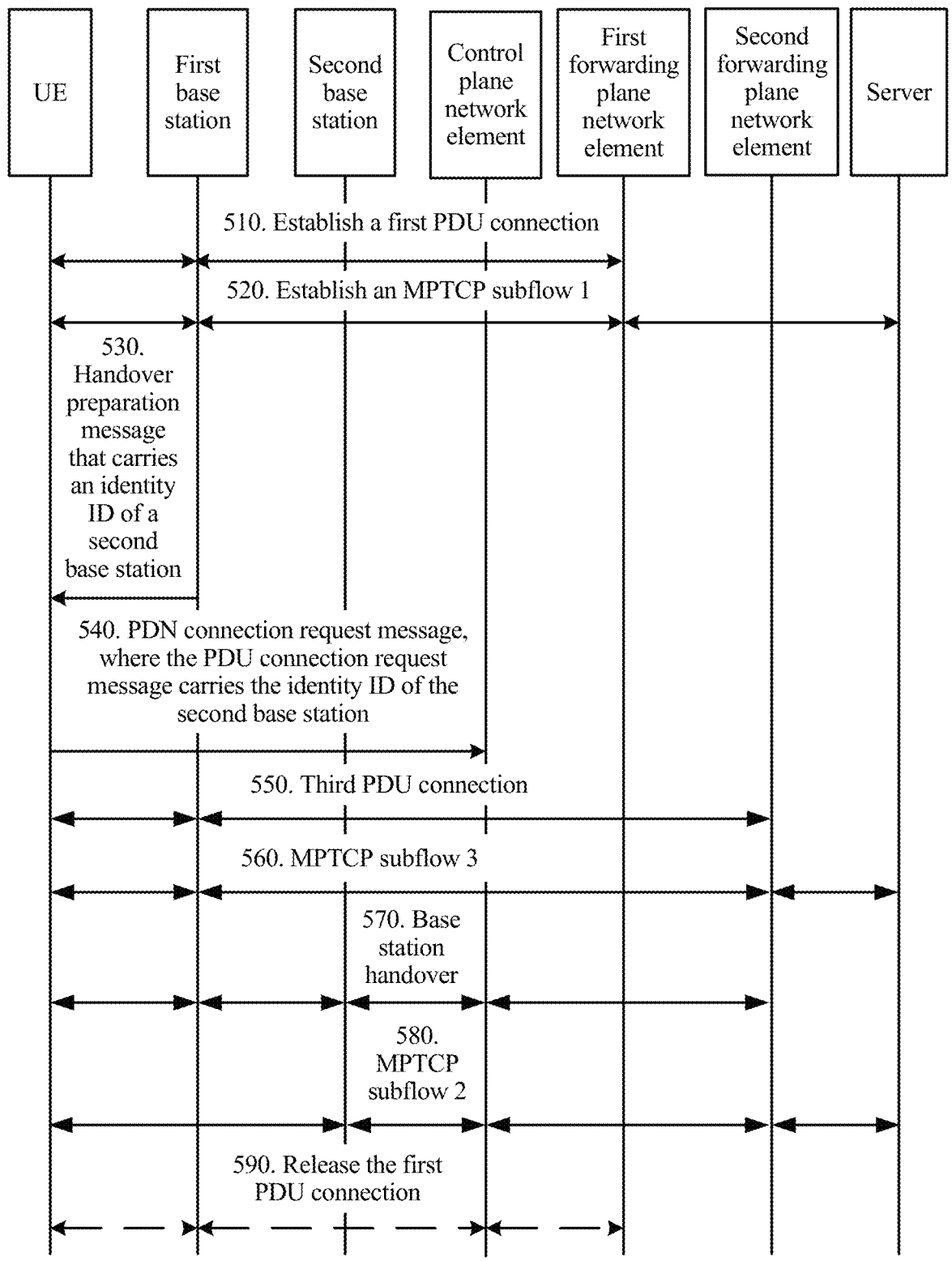
FIG. 11 is an interaction flowchart of a communication method according to another embodiment of this application.

FIG. 11 is an interaction flowchart of a communication method according to another embodiment of this application. Meanings of terms in this embodiment of this application are the same as those in the foregoing embodiments.

510: When UE is at a first location, the UE establishes a first PDU connection to a first forwarding plane network element by using a first base station, so that the UE performs communication by using the first base station and the first forwarding plane network element.

The first location may be any location in a coverage area of the first base station. The first PDU connection is established between the UE and the first forwarding plane network element, and an IP address allocated by the first forwarding plane network element to the UE is an IP 1. Specifically, the UE sends a PDU connection request to a control plane network element by using the first base station, and the control plane network element finds the first forwarding plane network element by using the first base station, so as to establish the first PDU connection between the UE and the first forwarding plane network element. Specifically, for a PDU connection process, refer to FIG. 5. Details are not described herein.

520: The UE initiates, to a server based on the IP 1, initialization of an MPTCP connection by using the first base station and the first forwarding plane network element, and establishes an MPTCP subflow 1. Therefore, the UE may perform communication by using the MPTCP subflow 1.

It should be noted that the UE and the server are user terminals that can both support the MPTCP. It should be further understood that the subflow may be further a connection of the TCP protocol supported by both the UE and the server, a subflow of another improved protocol, or the like. An MPTCP subflow is used as an example in this embodiment of this application for description. However, this application is not limited thereto.

530: When the UE needs to move from the first location to a second location, the UE obtains a handover preparation message, where the handover preparation message carries an identity ID of a second base station.

540: After learning the ID of the second base station, the UE may send a PDU connection request message to the control plane network element, where the PDU connection request message carries the identity ID of the second base station.

550: The control plane network element determines a second forwarding plane network element based on the identity ID of the second base station, so as to establish a third PDU connection, where the third PDU connection is used by the UE to perform communication by using the first base station and the second forwarding plane network element.

Optionally, that the control plane network element establishes the PDU connection based on the ID includes:

determining, by the control plane network element, the second forwarding plane network element based on the identity ID of the second base station; and establishing, by the control plane network element, the PDU connection, where the PDU connection is a connection established for the UE by using the first base station and the second forwarding plane network element.

Specifically, the control plane network element may determine the second forwarding plane network element in advance based on the ID of the second base station, so that the UE may establish the PDU connection (which may be indicated as the third PDU connection) by using the first base station and the second forwarding plane network element. The PDU connection request message may further carry other information and the like required for establishing the third PDU connection. This is not limited in this embodiment of this application.

560: The UE establishes an MPTCP subflow 3 based on an IP address allocated by the second forwarding plane network element, and the UE performs communication by using the MPTCP subflow 3.

570: The UE performs a base station handover from the first base station to the second base station when moving to the second location.

In this embodiment of this application, the base station handover may be an S1 interface based base station handover or an X2 interface based base station handover. A specific base station handover process includes step 2 to step 15 in FIG. 3, or includes step 2 to step 22 in FIG. 4A and FIG. 4B.

It should be understood that, after the UE completes the base station handover, the UE completes a PDU connection (which may be indicated as a second PDU connection) by using the second base station and the second forwarding plane network element. The second PDU connection is used by the UE to perform communication by using the second base station and the second forwarding plane network element.

Specifically, the UE performs the S1 interface based base station handover or the X2 interface based base station handover. When the UE receives downlink data sent by the second base station, it indicates that the UE has completed the base station handover from the first base station to the second base station. When the UE performs the X2 interface based base station handover, the downlink data may be sent by the server by using the second forwarding plane network element, the first base station, and the second base station in sequence. Alternatively, when the UE performs the S1 interface based base station handover, the downlink data may be sent by the server to the UE by using the second forwarding plane network element, the first base station, the second forwarding plane network element, and the second base station in sequence.

580: The UE completes the base station handover, in other words, completes a handover of an MPTCP subflow, and performs communication by using an MPTCP subflow 2 that is handed over.

590: After the UE performs communication by using the MPTCP subflow 2, the UE releases the first PDU connection.

After the UE performs communication by using the MPTCP subflow 2, the UE may disable the MPTCP subflow 1, and release the first PDU connection. To avoid repetition of a specific procedure, details are not described again.

Figure 12:
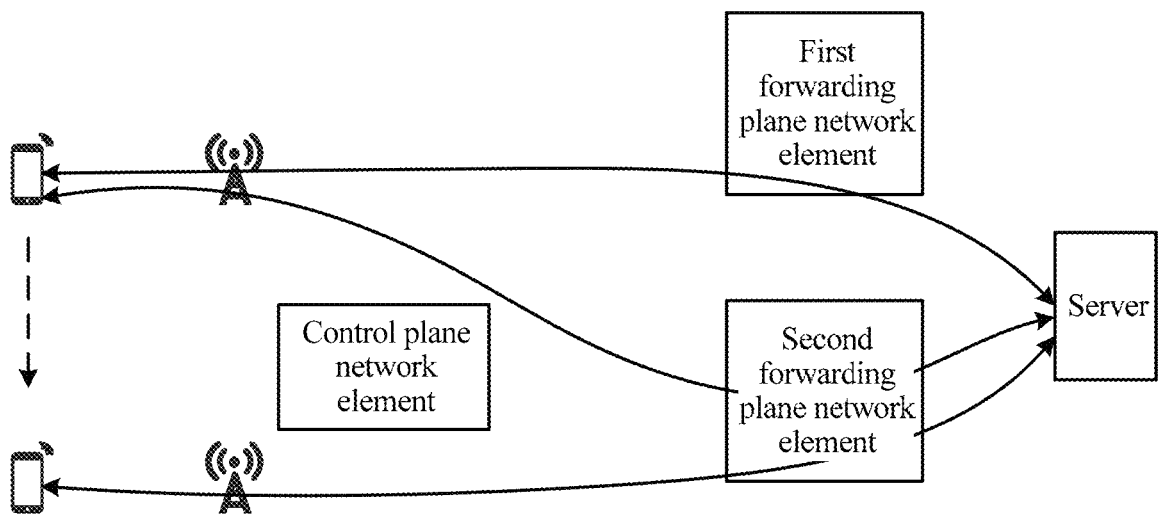
FIG. 12 is a model architectural diagram of a communication method according to another embodiment of this application.

To sum up, as shown in FIG. 12, according to the communication method in this embodiment of this application, when the UE needs to move, the UE obtains the ID of the second base station, selects the second forwarding plane network element based on the ID, establishes the third PDU connection to the first base station and the second forwarding plane network element, and performs communication by using the third PDU connection. After the UE moves to the second location and completes the base station handover, the UE establishes the second PDU connection to the second base station and the second forwarding plane network element, establishes, based on the second PDU connection, the MPTCP subflow for communication, and releases the first PDU connection.

It should be understood that reference may be made to the foregoing embodiments for a specific manner for indicating the foregoing corresponding information. For brevity, details are not described herein again.

Therefore, according to the communication method provided in this embodiment of this application, when the UE needs to move, the UE obtains the identity ID of the second base station in advance, and sends the ID of the second base station to the control plane network element, so that the control plane network element selects the second forwarding plane network element based on the ID of the second base station. The UE establishes the third PDU connection by using the first base station and the second forwarding plane network element. After the UE performs the handover from the first base station to the second base station, the UE completes establishment of the second PDU connection by using the second base station and the second forwarding plane network element, and performs communication by using the second PDU connection. This avoids a connection established by the UE by using the second base station and the first forwarding plane network element in the handover process, so that a handover delay of a service flow and a requirement on network deployment are reduced.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

Figure 13:
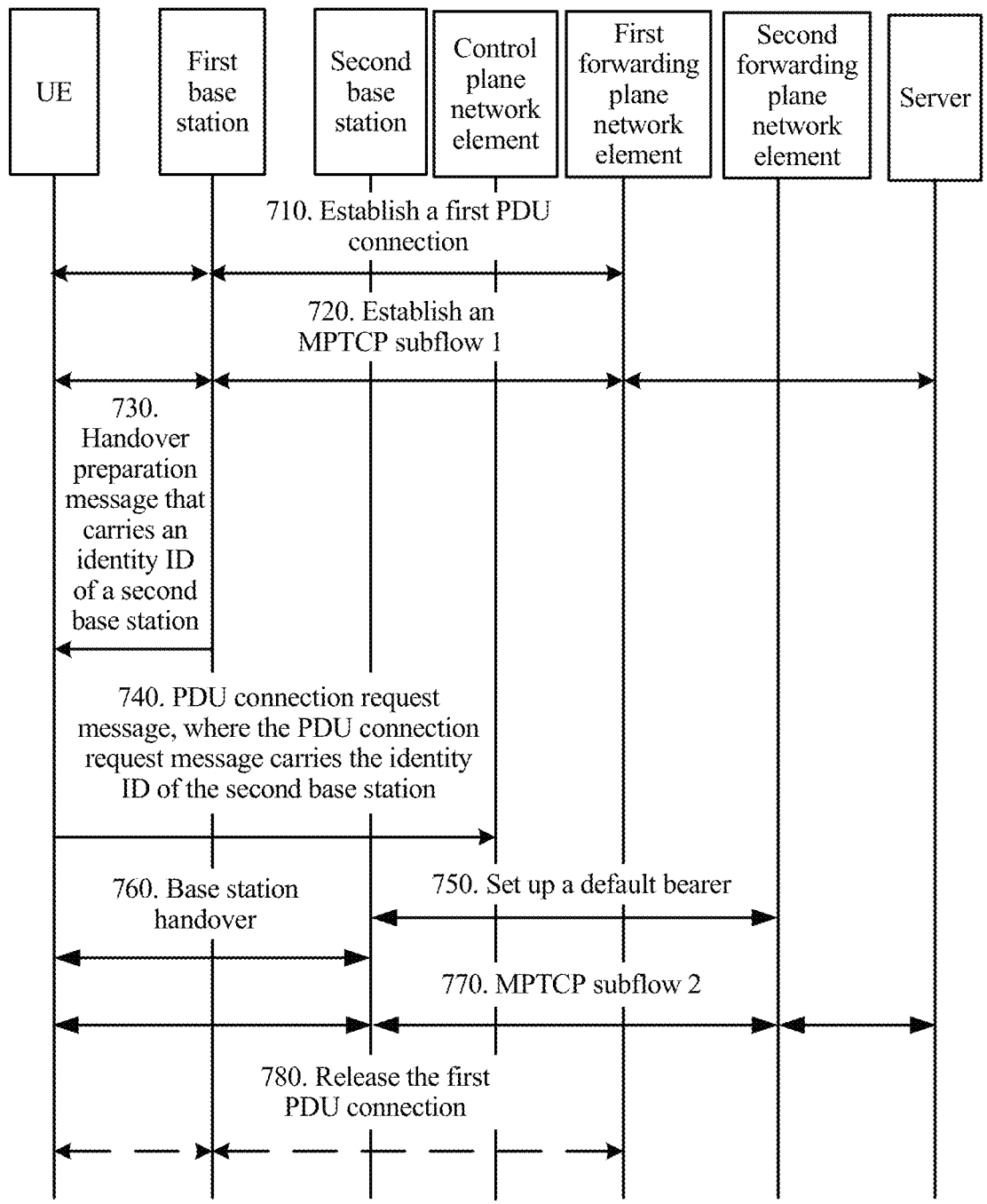
FIG. 13 is an interaction flowchart of a communication method according to another embodiment of this application.

FIG. 13 is an interaction flowchart of a communication method according to another embodiment of this application. Meanings of terms in this embodiment of this application are the same as those in the foregoing embodiments.

710: When UE is at a first location, the UE establishes a first PDU connection to a first forwarding plane network element by using a first base station, so that the UE performs communication by using the first base station and the first forwarding plane network element.

When the UE is at a current location (that is, the first location), a base station to which the UE belongs is the first base station. The first PDU connection is established between the UE and the first forwarding plane network element, and an IP address allocated by the first forwarding plane network element to the UE is an IP 1. Specifically, the UE sends a PDU connection request to a control plane network element by using the first base station, and the control plane network element finds the first forwarding plane network element by using the first base station, so as to establish the first PDU connection between the UE and the first forwarding plane network element. Specifically, for a PDU connection process, refer to FIG. 5. Details are not described herein.

720: The UE initiates, to a server based on the IP 1, initialization of an MPTCP connection by using the first base station and the first forwarding plane network element, and establishes an MPTCP subflow 1. Therefore, the UE may perform communication by using the MPTCP subflow 1.

It should be noted that the UE and the server are user terminals that can both support the MPTCP. It should be further understood that the subflow may be further a connection of the TCP protocol supported by both the UE and the server, a subflow of another improved protocol, or the like. An MPTCP subflow is used as an example in this embodiment of this application for description. However, this application is not limited thereto.

730: When the UE needs to move from the first location to a second location, the UE obtains a handover preparation message, where the handover preparation message carries an identity ID of a second base station.

740: The UE sends a PDU connection request message to the control plane network element, where the PDU connection request message carries the identity ID of the second base station. The control plane network element may select a second forwarding plane network element based on the identity ID of the second base station.

750: The control plane network element sets up a default bearer between the second base station and the second forwarding plane network element based on the ID.

Optionally, in an embodiment of this application, that the control plane network element establishes the PDU connection based on the identity ID of the second base station includes:

determining, by the control plane network element, the second forwarding plane network element based on the identity ID of the second base station; and establishing, by the control plane network element, a connection between the second base station and the second forwarding plane network element, so that the UE completes the PDU connection by using the second base station and the second forwarding plane network element after performing a handover from the first base station to the second base station.

Specifically, the control plane network element receives the PDU connection request message, determines the second forwarding plane network element based on the identity ID of the second base station carried in the PDU connection request message, and sends a create session request message to the second forwarding plane network element. The second forwarding plane network element returns a create session request response message to the control plane network element. Then, the control plane network element sends a bearer setup request message to the second base station. The second base station returns a bearer setup response message to the control plane network element. The control plane network element sends an update bearer request message to the second forwarding plane network element. The second forwarding plane network element returns an update bearer response message to the control plane network element, so as to complete setup of the default bearer between the second base station and a second gateway.

760: The UE performs the base station handover from the first base station to the second base station when moving to the second location.

In this embodiment of this application, the base station handover may be an S1 interface based base station handover or an X2 interface based base station handover. A specific base station handover process includes step 4 to step 6 in FIG. 3, or includes step 10 to step 12 in FIG. 4A and FIG. 4B.

It should be understood that, after the UE completes the base station handover, the UE completes a PDU connection (which may be indicated as a second PDU connection) by using the second base station and the second forwarding plane network element. The second PDU connection is used by the UE to perform communication by using the second base station and the second forwarding plane network element.

770: The UE establishes an MPTCP subflow 2 based on an IP address (an IP 2) allocated by the second forwarding plane network element, and the UE performs communication by using the MPTCP subflow 2.

Specifically, the UE establishes the MPTCP subflow 2 to a peer server by using the IP 2 by sending an SYN/ACK packet of the universal TCP, and the SYN/ACK packet includes an MP_JOIN option to add a TCP connection, so as to perform communication with the server by using the MPTCP subflow 2.

780: After the UE performs communication by using the MPTCP subflow 2, the UE releases the first PDU connection.

After the UE performs communication by using the MPTCP subflow 2, the UE may disable the MPTCP subflow 1, and release the first PDU connection. To avoid repetition of a specific procedure, details are not described again.

Figure 14:
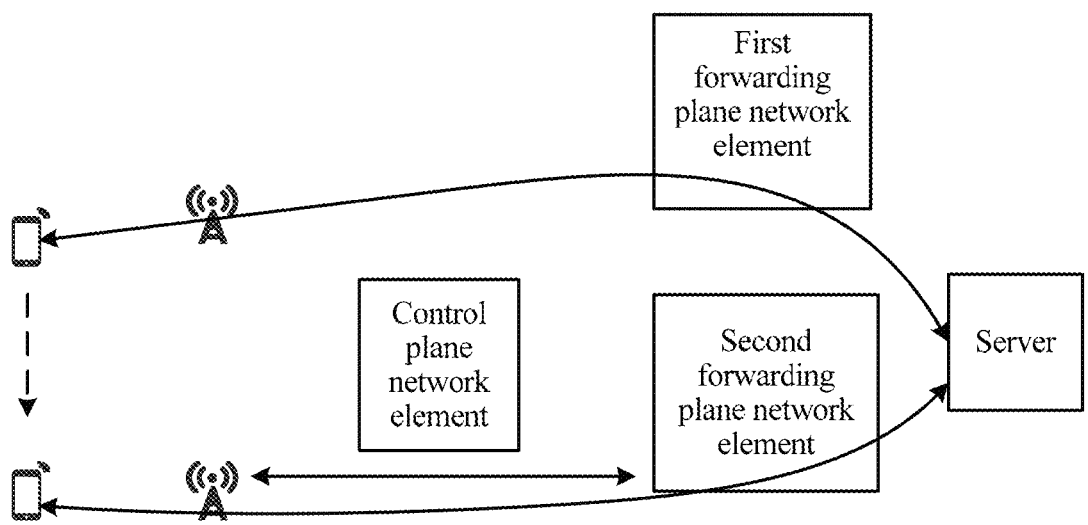
FIG. 14 is a model architectural diagram of a communication method according to another embodiment of this application.

To sum up, as shown in FIG. 14, according to the communication method in this embodiment of this application, when the UE needs to move, the UE obtains the identity ID of the second base station, selects the second forwarding plane network element based on the ID, establishes the connection between the second base station and the second forwarding plane network element. After the UE moves to the second location and completes the base station handover, the UE completes establishment of the second PDU connection by using the second base station and the second forwarding plane network element, establishes, based on the second PDU connection, the MPTCP subflow for communication, and releases the first PDU connection.

It should be understood that reference may be made to the foregoing embodiments for a specific manner for indicating the foregoing corresponding information. For brevity, details are not described herein again.

Therefore, according to the communication method provided in this embodiment of this application, before moving from the first location to the second location, the UE obtains the identity ID of the second base station, determines, based on the ID of the second base station, the second forwarding plane network element corresponding to the second base station, and establishes the connection between the second base station and the second forwarding plane network element in advance. After completing the base station handover, the UE performs communication by using the second PDU connection established between the second base station and the second forwarding plane network element by the UE, so that the UE establishes the connection between the second base station and the second forwarding plane network element in advance when the UE moves, so that a handover delay of a service flow and a requirement on network deployment are reduced.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

Figure 15:
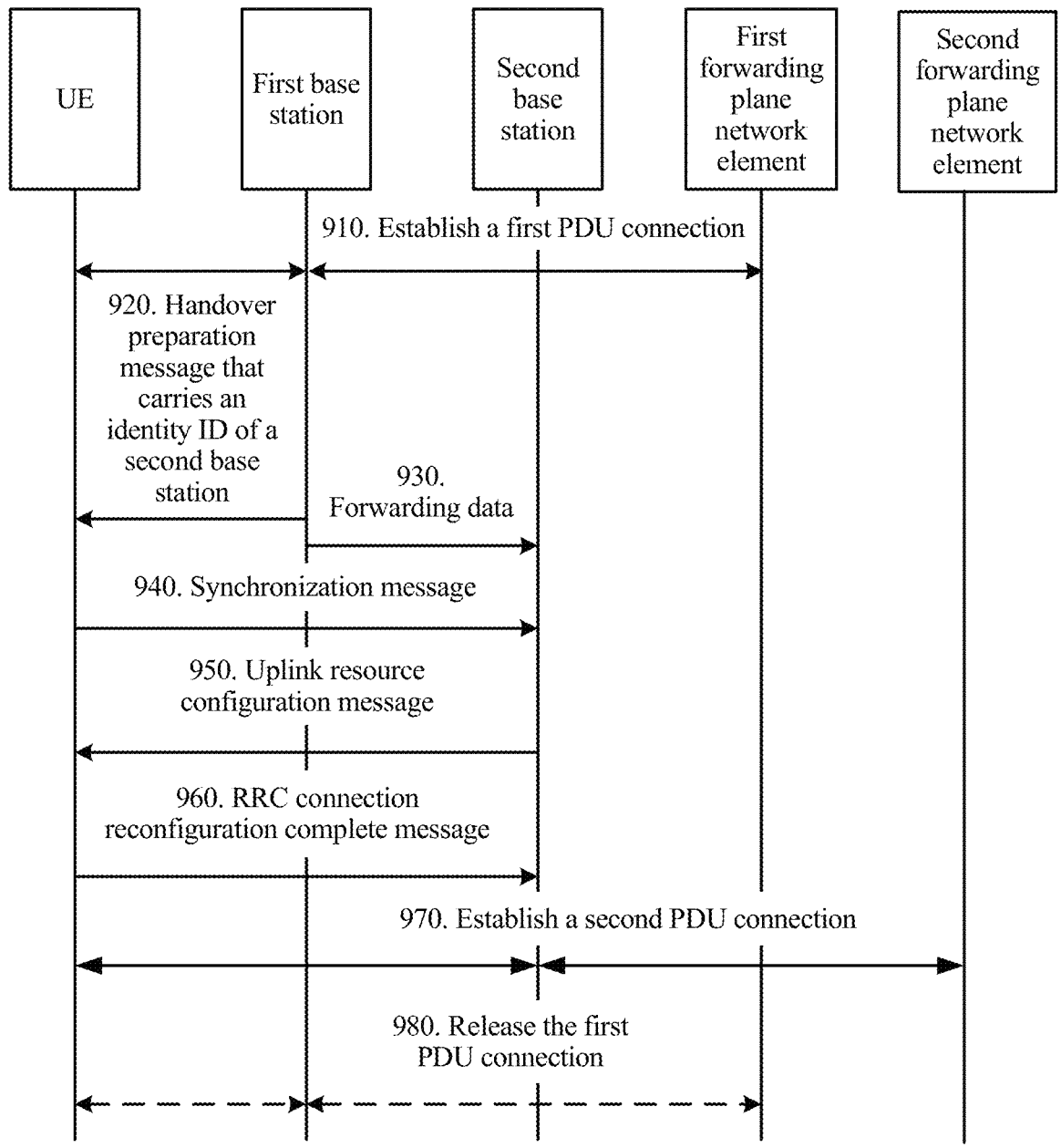
FIG. 15 is an interaction flowchart of a communication method according to another embodiment of this application.

FIG. 15 is an interaction flowchart of a communication method according to an embodiment of this application. It should be noted that this embodiment is merely provided to help a person skilled in the art better understand embodiments of this application, instead of limiting the scope of the embodiments of this application.

910: When UE is at a first location, the UE establishes a first PDU connection to a first forwarding plane network element by using a first base station. Therefore, the UE may perform communication by using the first PDU connection.

920: When the UE moves from the first location to a second location, the UE receives a handover preparation message sent by the first base station, where the handover preparation message carries an identity ID of a second base station.

930: The server sends downlink data (that is, forwarding data) to the second base station by using the first forwarding plane network element and the first base station in sequence, where the first base station may send the forwarding data to the second base station through a first forwarding tunnel.

Alternatively, this step and step 920 may be simultaneously performed. Alternatively, this step is performed after step 920. This is not limited in this application.

940: The UE sends a synchronization message to the second base station based on the identity ID of the second base station, to maintain synchronization between the UE and the second base station.

950: The second base station receives the synchronization message, and returns an uplink resource configuration message to the UE.

960: The UE receives the uplink resource configuration message, and sends an RRC connection reconfiguration complete message to the second base station, where the connection reconfiguration complete message is used to indicate that the UE has completed a resource configuration, and the RRC connection reconfiguration complete message carries bearer-less handover indication information.

Optionally, after completing a base station handover, the UE may receive downlink data sent by the second base station. The downlink data may be sent by the server by using the first forwarding plane network element, the first base station, and the second base station in sequence in a base station handover process. The first base station is connected to the second base station by using the first forwarding tunnel.

970: After performing the handover from the first base station to the second base station, the UE establishes a second PDU connection by using the second base station and the second forwarding plane network element, and performs communication by using the second PDU connection.

980: The UE releases the first PDU connection when a preset moment expires.

It should be understood that reference may be made to the foregoing embodiments for a specific manner for indicating the foregoing corresponding information. For brevity, details are not described herein again.

Therefore, according to the communication method in this embodiment of this application, when the UE is in a coverage area of the first base station, the UE performs communication by using the first PDU connection via the first forwarding plane network element. After the UE moves, the UE performs the handover from the first base station to the second base station. When performing the handover, the UE sends the bearer-less handover indication information to the second base station, and the bearer-less handover indication information is used to instruct the second base station not to establish the connection to the first forwarding plane network element, so that the second base station can avoid, after the UE moves, establishing the connection to the first forwarding plane network element. Therefore, a handover delay of a service flow is reduced.

Figure 16A:
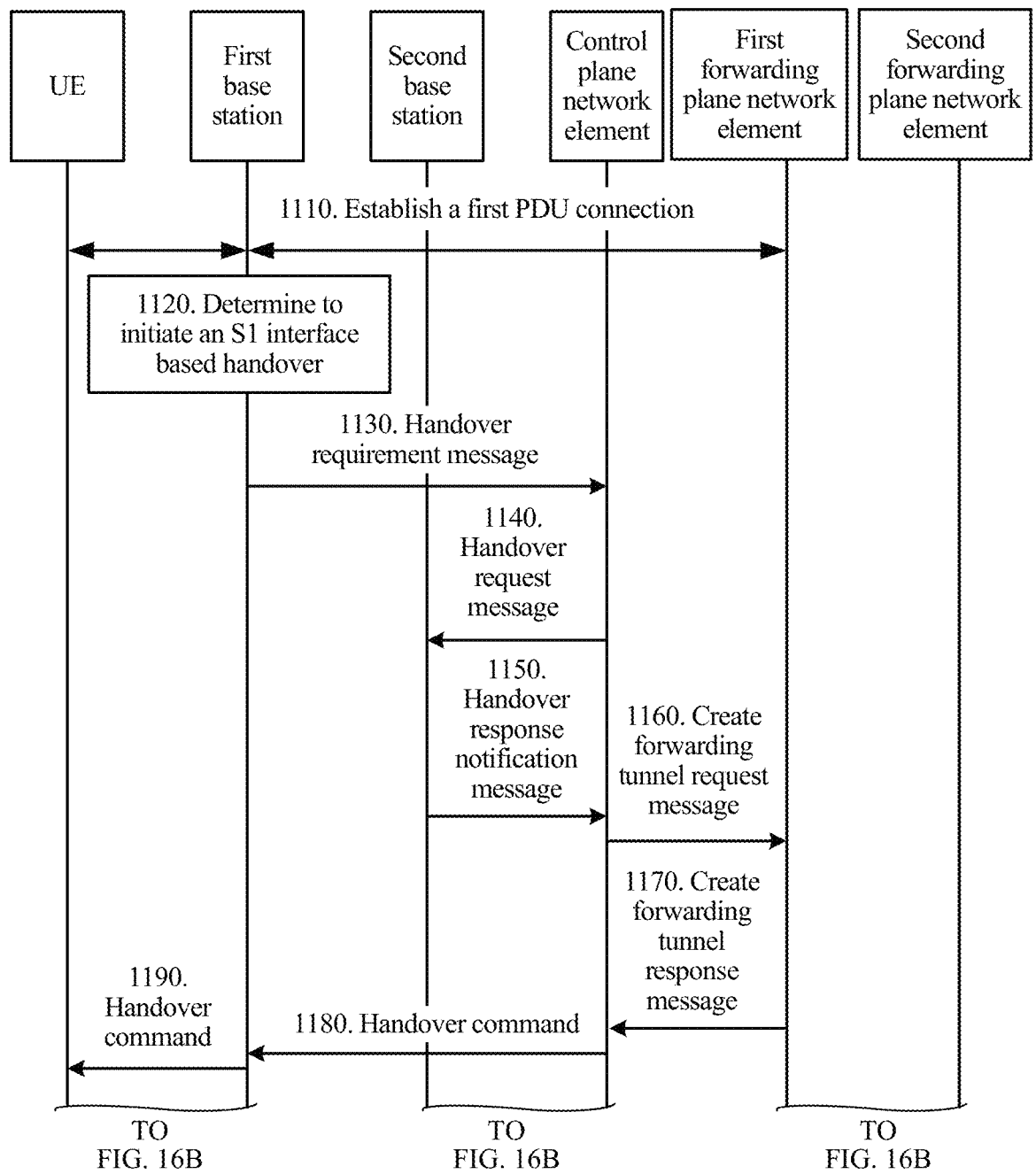
FIG. 16A and FIG. 16B are an interaction flowchart of a communication method according to another embodiment of this application.
Figure 16B:
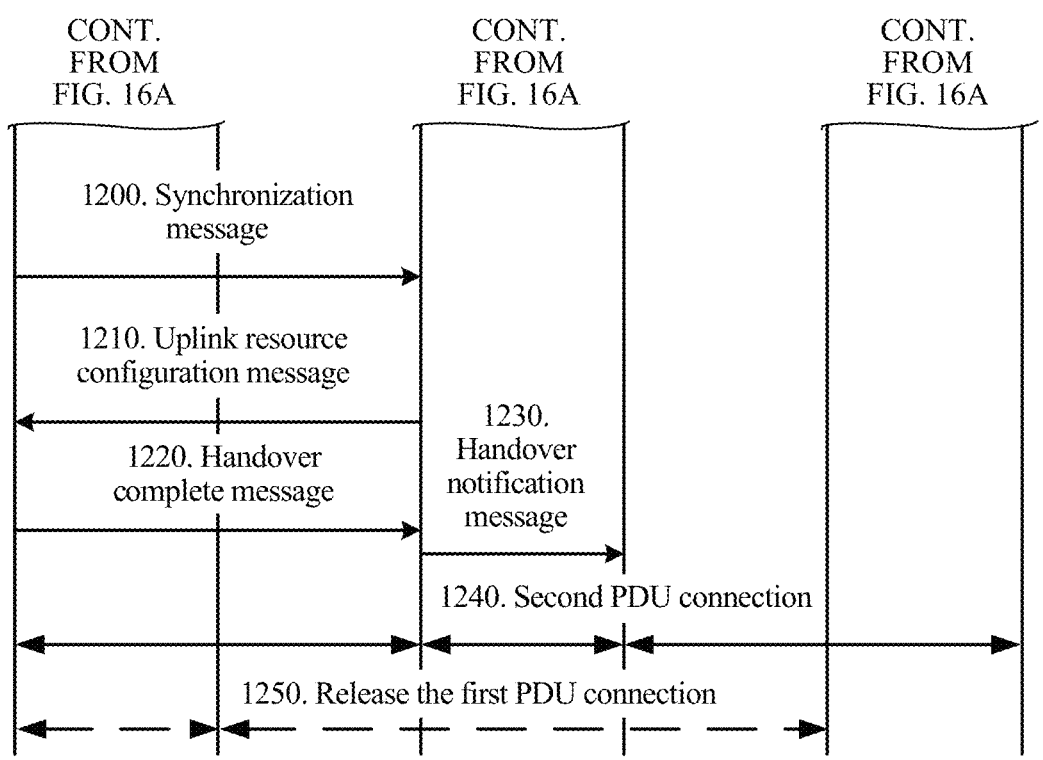

FIG. 16A and FIG. 16B are an interaction flowchart of a communication method according to another embodiment of this application. Meanings of terms in this embodiment of this application are the same as those in the foregoing embodiments.

1110: When UE is at a first location, the UE establishes a first PDU connection to a first forwarding plane network element by using a first base station, so that the UE performs communication by using the first base station and the first forwarding plane network element.

1120: When the UE moves from the first location to a second location, the first base station determines to initiate an S1 interface based handover.

1130: The first base station sends a handover requirement message to a control plane network element.

1140: The control plane network element sends a handover request message to a second base station based on the handover requirement message.

1150: The second base station sends a handover response notification message to the control plane network element.

1160: The control plane network element receives the handover response notification message, and sends a create forwarding tunnel request message to the first forwarding plane network element, to establish a second forwarding tunnel between the first forwarding plane network element and the second base station.

1170: The first forwarding plane network element returns a create forwarding tunnel response message to the control plane network element, to indicate completion of establishment of the second forwarding tunnel.

1180: The control plane network element sends a base station handover command to the first base station, and sends the base station handover command to the UE by using the first base station.

1190: The first base station sends the base station handover command to the UE, to instruct the UE to perform a base station handover.

1200: The UE sends a synchronization message to the second base station, to maintain synchronization between the UE and the second base station.

1210: The second base station receives the synchronization message, and sends an uplink resource configuration message to the UE.

1220: The UE receives the uplink resource configuration message, and sends a handover complete message to the second base station, where the handover complete message is used to indicate that the UE has completed the base station handover, and the handover complete message carries bearer-less handover indication information.

When the UE moves from the first location to the second location, an IP address and an uplink/downlink path of a UE service flow need to be anchored at a forwarding plane network element, to ensure IP continuity. Therefore, after the UE completes the base station handover from the first base station to the second base station, the second base station initiates the PDU connection to the first forwarding plane network element. In this embodiment of this application, in a process of completing the base station handover, the UE sends, to the second base station, the handover complete message that carries the bearer-less handover indication information, and the bearer-less handover indication information is used to indicate that the second base station does not need to initiate the PDU connection to the first forwarding plane network element, so that interconnection deployment does not need to be performed between the second base station and a peripheral forwarding plane network element. This reduces network planning complexity and a handover delay of a data path.

It should be understood that the bearer-less handover indication information may be alternatively carried in an RRC connection reconfiguration complete message. Different from FIG. 4A and FIG. 4B in the prior art, the bearer-less handover indication information may be alternatively carried in another message before the handover complete message, such as the synchronization message or another message that is not displayed. Alternatively, the bearer-less handover indication information may be independently sent. This is not limited in this application.

1230: After receiving the handover complete message, the second base station sends a handover notification message to the control plane network element, to notify the control plane network element that the UE has completed the base station handover.

1240: After completing the base station handover, the UE establishes a second PDU connection.

After completing the base station handover, the UE may establish the second PDU connection by using the second base station and a second forwarding plane network element, and the second forwarding plane network element allocates an IP address to the UE.

1250: The UE releases the first PDU connection when a preset moment expires.

It should be understood that reference may be made to the foregoing embodiments for a specific manner for indicating the foregoing corresponding information. For brevity, details are not described herein again.

Therefore, according to the communication method provided in this embodiment of this application, when the UE is in a coverage area of the first base station, the UE performs communication by using the first PDU connection via the first forwarding plane network element. After the UE moves, the UE performs the handover from the first base station to the second base station. When performing the handover, the UE sends the bearer-less handover indication information to the second base station, and the bearer-less handover indication information is used to instruct the second base station not to establish the connection to the first forwarding plane network element, so that the second base station can avoid, after the UE moves, establishing the connection to the first forwarding plane network element. Therefore, a handover delay of a service flow is reduced.

Figure 17:
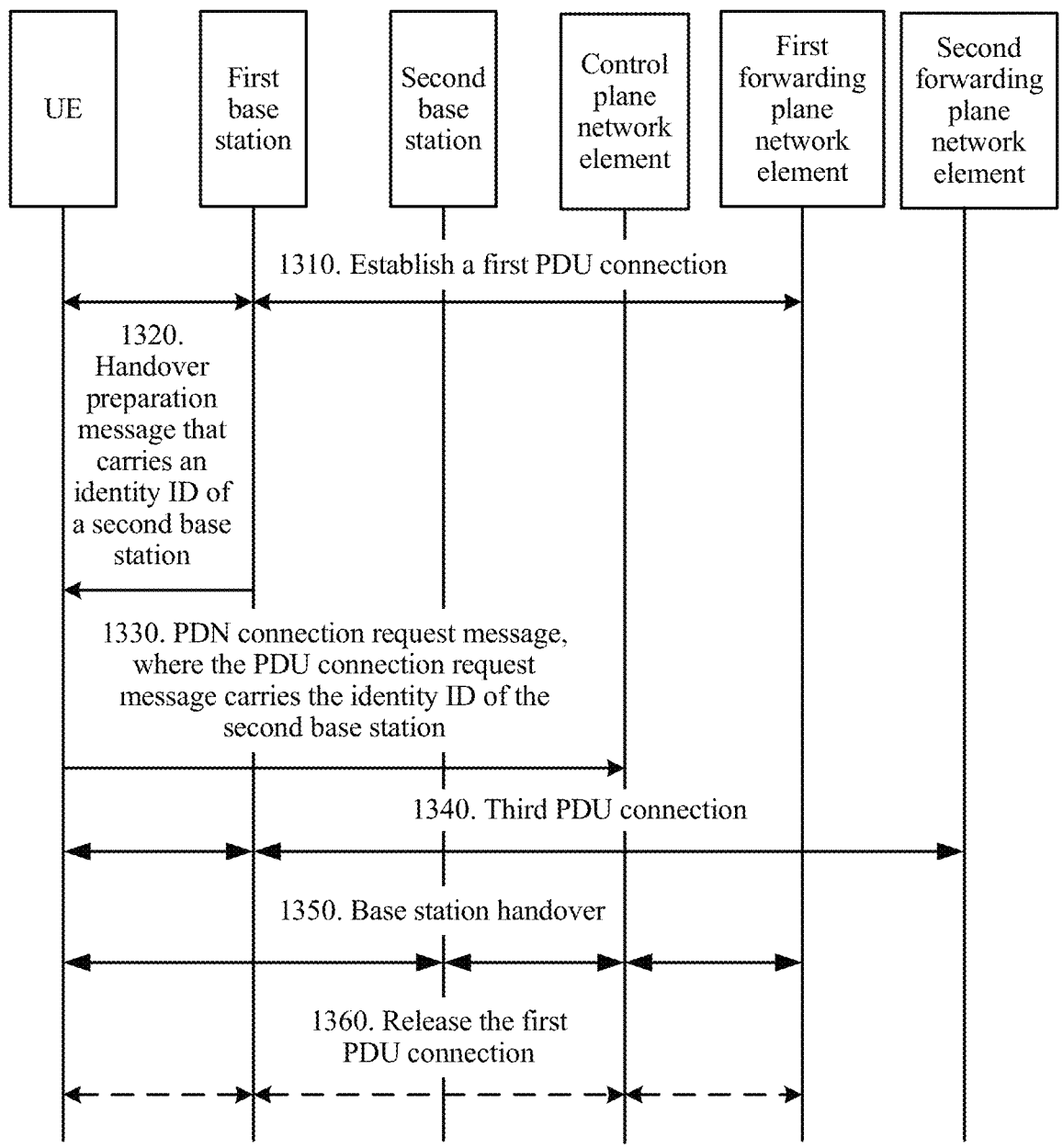
FIG. 17 is an interaction flowchart of a communication method according to another embodiment of this application.

FIG. 17 is an interaction flowchart of a communication method according to another embodiment of this application. Meanings of terms in this embodiment of this application are the same as those in the foregoing embodiments.

1310: When UE is at a first location, the UE establishes a first PDU connection to a first forwarding plane network element by using a first base station, so that the UE performs communication by using the first base station and the first forwarding plane network element.

1320: When the UE needs to move from the first location to a second location, the UE obtains a handover preparation message, where the handover preparation message carries an identity ID of a second base station.

1330: After learning the identity ID of the second base station, the UE may send a PDU connection request message to a control plane network element, where the PDU connection request message carries the identity ID of the second base station.

1340: The control plane network element determines a second forwarding plane network element based on the PDU connection request message, so as to establish a third PDU connection, where the third PDU connection is used by the UE to perform communication by using the first base station and the second forwarding plane network element.

1350: When moving to the second location, the UE performs a base station handover from the first base station to the second base station, where after the UE completes the base station handover, the UE completes a PDU connection by using the second base station and the second forwarding plane network element, and the second PDU connection is used by the UE to perform communication by using the second base station and the second forwarding plane network element.

1360: After the UE communicates with a server, the UE releases the first PDU connection.

It should be understood that reference may be made to the foregoing embodiments for a specific manner for indicating the foregoing corresponding information. For brevity, details are not described herein again.

Therefore, according to the communication method provided in this embodiment of this application, when the UE needs to move, the UE obtains the identity ID of the second base station in advance, and sends the ID of the second base station to the control plane network element, so that the control plane network element establishes the third PDU connection by using the first base station and the second forwarding plane network element based on the ID of the second base station. When the UE performs the handover from the first base station to the second base station, the UE completes establishment of the second PDU connection by using the second base station and the second forwarding plane network element, and performs communication by using the second PDU connection. This avoids a connection established by the UE by using the second base station and the first forwarding plane network element in a handover process, so that a handover delay of a service flow and a requirement on network deployment are reduced.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

Figure 18:
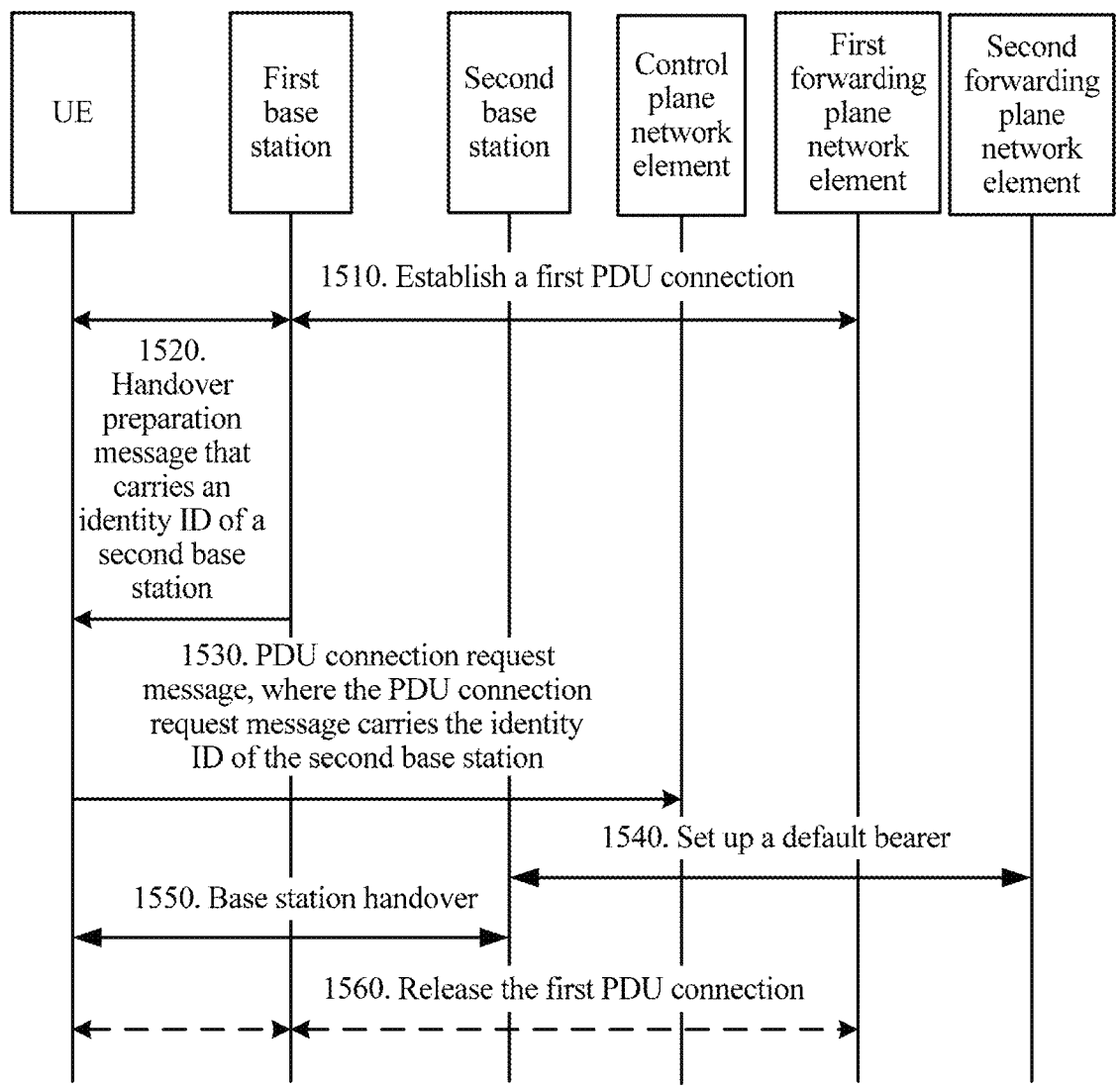
FIG. 18 is an interaction flowchart of a communication method according to another embodiment of this application.

FIG. 18 is an interaction flowchart of a communication method according to another embodiment of this application. Meanings of terms in this embodiment of this application are the same as those in the foregoing embodiments.

1510: When UE is at a first location, the UE establishes a first PDU connection to a first forwarding plane network element by using a first base station, so that the UE performs communication by using the first base station and the first forwarding plane network element.

1520: When the UE needs to move from the first location to a second location, the UE obtains a handover preparation message, where the handover preparation message carries an identity ID of a second base station.

1530: The UE sends a PDU connection request message to a control plane network element, where the PDU connection request message carries the identity ID of the second base station. The control plane network element may determine a second forwarding plane network element based on the identity ID of the second base station.

1540: The control plane network element sets up a default bearer between the second base station and the second forwarding plane network element based on the ID.

1550: When moving to the second location, the UE performs a base station handover from the first base station to the second base station, where after the UE accesses the second base station, the UE completes a PDU connection (which may be indicated as a second PDU connection) by using the second base station and the second forwarding plane network element, and the second PDU connection is used by the UE to perform communication by using the second base station and the second forwarding plane network element.

1560: After the UE performs communication by using the second PDU connection, the UE releases the first PDU connection.

It should be understood that reference may be made to the foregoing embodiments for a specific manner for indicating the foregoing corresponding information. For brevity, details are not described herein again.

Therefore, according to the communication method provided in this embodiment of this application, before the UE moves from the first location to the second location, the control plane network element obtains the ID of the second base station, selects the second forwarding plane network element based on the ID of the second base station, and establishes a connection between the second base station and the second forwarding plane network element in advance. After accessing the second base station, the UE performs communication by using the second PDU connection established between the second base station and the second forwarding plane network element by the UE, so that the UE establishes the connection between the second base station and the second forwarding plane network element in advance when the UE moves, so that a handover delay of a service flow and a requirement on network deployment are reduced.

The foregoing has described in detail the communication method in the embodiments of this application. The following describes user equipment in the embodiments of this application.

Figure 19:
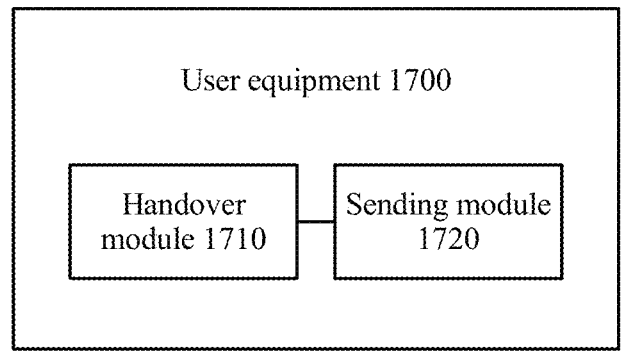
FIG. 19 is a schematic block diagram of user equipment according to an embodiment of this application.

FIG. 19 is a schematic block diagram of user equipment 1700 according to an embodiment of this application. As shown in FIG. 19, the user equipment 1700 includes:

a handover module 1710, configured to perform a handover from a first base station to a second base station, where the UE performs communication at the first base station by using a first packet data unit PDU connection via a first forwarding plane network element; and a sending module 1720, configured to send bearer-less handover indication information to the second base station when the handover is being performed, where the bearer-less handover indication information is used to instruct the second base station not to establish the connection to the first forwarding plane network element.

Optionally, in this embodiment of this application, the sending module 1720 is specifically configured to:

send a connection reconfiguration complete message to the second base station, where the connection reconfiguration complete message carries the bearer-less handover indication information.

In this embodiment of this application, optionally, the UE 1700 further includes:

a processing module, configured to: after the second base station is accessed, establish a second PDU connection by using the second base station and a second forwarding plane network element, where the second forwarding plane network element is a gateway corresponding to the second base station; and a communications module, configured to perform communication by using the second PDU connection.

Optionally, the UE 1700 further includes:

a release module, configured to release the first PDU connection when a preset time threshold is reached.

The user equipment 1700 in this embodiment of this application may correspond to the user equipment in the communication method in the embodiment of this application, and the foregoing and other operations and/or functions of the modules in the user equipment 1700 are separately intended for implementing corresponding procedures in the foregoing methods. For brevity, details are not described herein again.

Therefore, when being in a coverage area of the first base station, the UE provided in this embodiment of this application performs communication by using the first PDU connection via the first forwarding plane network element. After the UE moves, the UE performs the handover from the first base station to the second base station. When performing the handover, the UE sends the bearer-less handover indication information to the second base station, and the bearer-less handover indication information is used to instruct the second base station not to establish the connection to the first forwarding plane network element, so that the second base station can avoid, after the UE moves, establishing the connection to the first forwarding plane network element. Therefore, a handover delay of a service flow is reduced.

Figure 20:
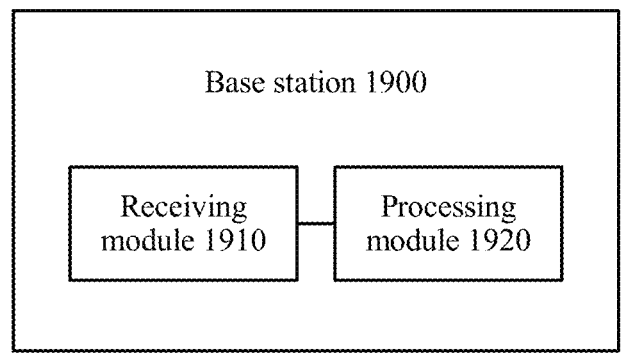
FIG. 20 is a schematic block diagram of a base station according to an embodiment of this application.

FIG. 20 is a schematic block diagram of a base station 1900 according to an embodiment of this application. As shown in FIG. 20, the base station 1900 includes:

a receiving module 1910, configured to receive bearer-less handover indication information sent by user equipment UE when the UE performs a handover from a first base station to a second base station, where the UE performs communication at the first base station by using a first packet data unit PDU connection via a first forwarding plane network element, and the bearer-less handover indication information is used to instruct the second base station not to establish a connection to the first forwarding plane network element; and a processing module 1920, configured to determine, according to the bearer-less handover indication information received by the receiving module 1910, not to establish the connection to the first forwarding plane network element.

Optionally, in this embodiment of this application, the receiving module 1910 is specifically configured to:

receive a handover complete message sent by the UE, where the handover complete message carries bearer-less handover indication information.

The second base station 1900 in this embodiment of this application may correspond to the base station in the communication method in the embodiment of this application, and the foregoing and other operations and/or functions of the modules in the second base station 1900 are separately intended for implementing corresponding procedures in the foregoing methods. For brevity, details are not described herein again.

Therefore, the second base station in this embodiment of this application receives the bearer-less handover indication information sent by the UE, and determines, according to the bearer-less handover indication information, not to establish the connection to the first forwarding plane network element, so that a handover delay of a service flow and a requirement on network deployment are reduced.

Figure 21:
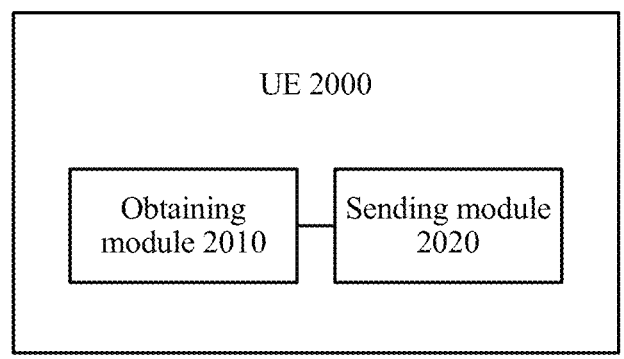
FIG. 21 is a schematic block diagram of user equipment according to another embodiment of this application.

FIG. 21 is a schematic block diagram of UE 2000 according to an embodiment of this application. As shown in FIG. 21, the UE 2000 includes:

an obtaining module 2010, configured to obtain an identity ID of a second base station from a first base station, where the second base station is a base station to which the UE prepares to perform a handover from the first base station; and a sending module 2020, configured to send a connection request message to a control plane network element, where the connection request message carries the identity ID of the second base station, so that the control plane network element establishes a packet data unit PDU connection based on the identity ID of the second base station, the PDU connection is a connection between the UE and the second forwarding plane network element, and the second forwarding plane network element is selected by the control plane network element based on the identity ID of the second base station.

Optionally, in this embodiment of this application, the UE 2000 further includes:

a communications module, configured to perform communication by using the PDU connection.

Therefore, when the UE needs to move, the UE in this embodiment of this application obtains the identity ID of the second base station in advance, and sends the ID of the second base station to the control plane network element, so that the control plane network element selects the second forwarding plane network element based on the ID of the second base station, and the PDU connection is established between the UE and the second forwarding plane network element. This avoids a connection established by the UE by using the second base station and a first forwarding plane network element in a handover process, so that a handover delay of a service flow and a requirement on network deployment are reduced.

The user equipment 2000 in this embodiment of this application may correspond to the user equipment in the embodiment of this application, and the foregoing and other operations and/or functions of the modules in the user equipment 2000 are separately intended for implementing corresponding procedures in the foregoing methods. For brevity, details are not described herein again.

Figure 22:
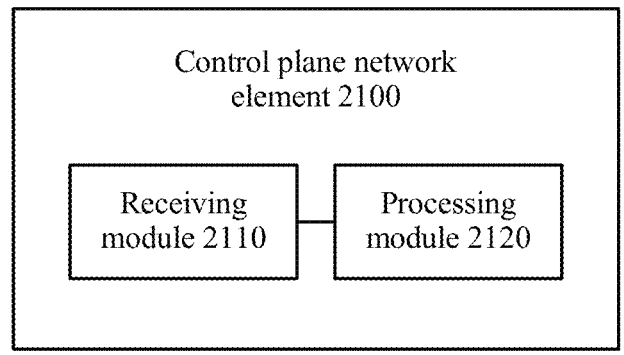
FIG. 22 is a schematic block diagram of a control plane network element according to an embodiment of this application.

FIG. 22 is a schematic block diagram of a control plane network element 2100 according to an embodiment of this application. As shown in FIG. 22, the control plane network element 2100 includes:

a receiving module 2110, configured to receive a packet data unit PDU connection request message sent by user equipment UE, where the PDU connection request message carries an identity ID of a second base station, and the second base station is a base station to which the UE prepares to perform a handover from a currently accessed first base station; and a processing module 2120, configured to establish a PDU connection based on the identity ID of the second base station, where the PDU connection is a connection between the UE and a second forwarding plane network element, and the second forwarding plane network element is selected based on the identity ID of the second base station.

Therefore, the control plane network element in this embodiment of this application receives the identity ID of the second base station sent by the UE, selects the second forwarding plane network element based on the ID of the second base station, and establishes the PDU connection between the UE and the second forwarding plane network element. This avoids a connection established by the UE by using the second base station and the first forwarding plane network element in a handover process, so that a handover delay of a service flow and a requirement on network deployment are reduced.

Optionally, in this embodiment of this application, the processing module 2120 is specifically configured to:

determine the second forwarding plane network element based on the identity ID of the second base station; and establish a connection between the second base station and the second forwarding plane network element, so that the UE completes the PDU connection by using the second base station and the second forwarding plane network element after performing the handover from the first base station to the second base station.

Optionally, in this embodiment of this application, the processing module 2120 is specifically configured to:

determine the second forwarding plane network element based on the identity ID of the second base station; and establish the PDU connection, where the PDU connection is a connection established for the UE by using the first base station and the second forwarding plane network element.

Therefore, the control plane network element in this embodiment of this application receives the identity ID of the second base station sent by the UE, selects the second forwarding plane network element based on the ID of the second base station, and establishes the PDU connection between the UE and the second forwarding plane network element. This avoids a connection established by the UE by using the second base station and the first forwarding plane network element in a handover process, so that a handover delay of a service flow and a requirement on network deployment are reduced.

The control plane network element 2100 in this embodiment of this application may correspond to the control plane network element in the communication method in the embodiment of this application, and the foregoing and other operations and/or functions of the modules in the control plane network element 2100 are separately intended for implementing corresponding procedures in the foregoing methods. For brevity, details are not described herein again.

Figure 23:
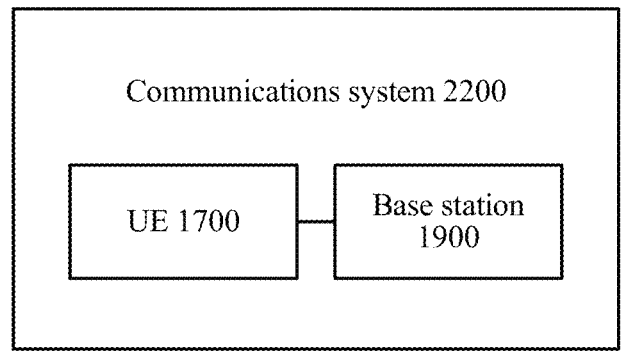
FIG. 23 is a schematic block diagram of a communications system according to an embodiment of this application.

An embodiment of this application further provides a communications system 2200. As shown in FIG. 23, the communications system 2200 includes:

the UE 1700 in the foregoing embodiment of this application and the base station 1900 in the embodiment of this application.

Figure 24:
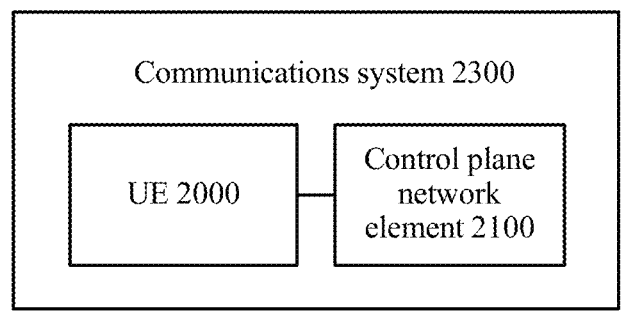
FIG. 24 is a schematic block diagram of a communications system according to another embodiment of this application.

An embodiment of this application further provides a communications system 2300. As shown in FIG. 24, the communications system 2300 includes:

the UE 2000 in the foregoing embodiment of this application and the control plane network element 2100 in the embodiment of this application.

Figure 25:
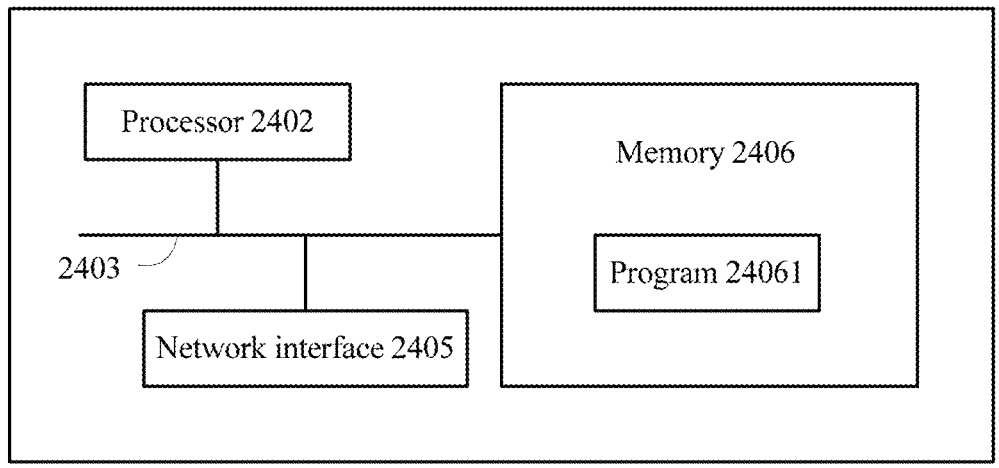
FIG. 25 is a schematic structural diagram of user equipment according to an embodiment of this application.

FIG. 25 shows a structure of UE according to still another embodiment of this application. The UE includes at least one processor 2402 (such as a general purpose processor CPU having computing and processing capabilities, a digital signal processor (DSP), an application-specific integrated circuit (ASIC), or a field programmable gate array (FPGA)). The processor manages and schedules modules and devices in the user equipment. The UE further includes at least one network interface 2405 or another communications interface, a memory 2406, and at least one bus system 2403. Components of the user equipment are coupled together by using the bus system 2403. The bus system 2403 may include a data bus, a power bus, a control bus, a signal status bus, and the like. However, for clear description, all the buses in the figure are marked as the bus system 2403.

The method disclosed in the embodiment of this application may be applied to the processor 2402, or is used to execute an executable module stored in the memory 2406, for example, a computer program. The memory 2406 may include a high speed random access memory (RAM), or may include a non-volatile memory. The memory may include a read-only memory and a random access memory, and provide required signaling or data, a required program, and the like for the processor.

A part of the memory may further include a non-volatile random access memory (NVRAM). A communication connection to at least one another network element is implemented by using the at least one network interface 2405 (which may be wired or wireless).

In some implementations, the memory 2406 stores a program 24061, and the processor 2402 executes the program 24061, to perform the following operations:

performing a handover from a first base station to a second base station, where the UE performs communication at the first base station by using a first packet data unit PDU connection via a first forwarding plane network element; and sending bearer-less handover indication information to the second base station when performing the handover, where the bearer-less handover indication information is used to instruct the second base station not to establish a connection to the first forwarding plane network element.

It should be noted that the user equipment may be specifically the user equipment in the foregoing embodiment, and may be configured to perform the steps and/or procedures corresponding to the user equipment in the foregoing method embodiment.

It can be learned from the foregoing technical solution provided in this embodiment of this application that, when the UE is in a coverage area of the first base station, the UE performs communication by using the first PDU connection via the first forwarding plane network element. After the UE moves, the UE performs the handover from the first base station to the second base station. When performing the handover, the UE sends the bearer-less handover indication information to the second base station, and the bearer-less handover indication information is used to instruct the second base station not to establish the connection to the first forwarding plane network element, so that the second base station can avoid, after the UE moves, establishing the connection to the first forwarding plane network element. Therefore, a handover delay of a service flow is reduced.

The UE 2400 in this embodiment of this application may correspond to the user equipment in the communication method in the embodiment of this application, and the foregoing and other operations and/or functions of the modules in the UE 2400 are separately intended for implementing corresponding procedures in the foregoing methods. For brevity, details are not described herein again.

Figure 26:
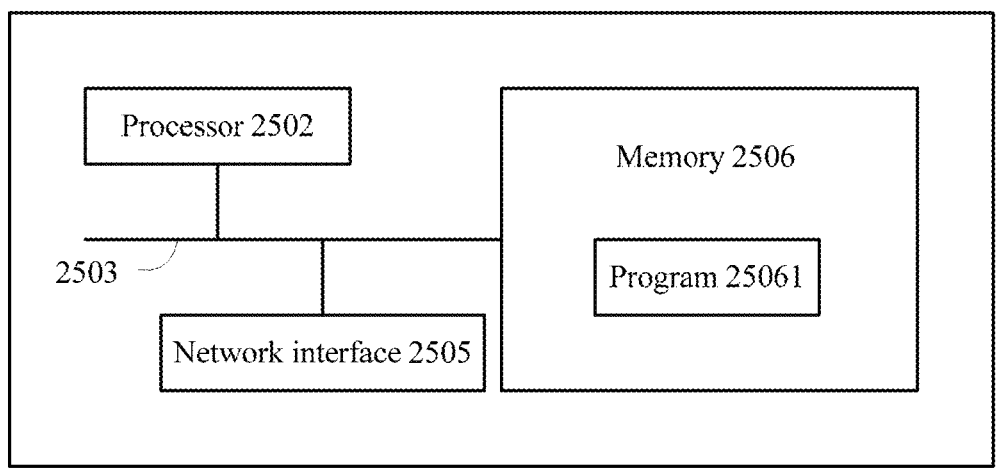
FIG. 26 is a schematic structural diagram of a base station according to an embodiment of this application.

FIG. 26 shows a structure of a base station according to still another embodiment of this application. The base station includes at least one processor 2502 (such as a general purpose processor CPU having computing and processing capabilities, a DSP, an ASIC, or a FPGA). The base station further includes at least one network interface 2505 or another communications interface, a memory 2506, and at least one bus system 2503. Components of the base station are coupled together by using the bus system 2503. The bus system 2503 may include a data bus, a power bus, a control bus, a signal status bus, and the like. However, for clear description, all the buses in the figure are marked as the bus system 2503.

The method disclosed in the embodiment of this application may be applied to the processor 2502, or is used to execute an executable module stored in the memory 2506, for example, a computer program. The memory 2506 may include a high speed RAM, or may include a non-volatile memory. The memory may include a read-only memory and a random access memory, and provide required signaling or data, a required program, and the like for the processor. A part of the memory may further include a NVRAM. A communication connection to at least one another network element is implemented by using the at least one network interface 2505 (which may be wired or wireless).

In some implementations, the memory 2506 stores a program 25061, and the processor 2502 executes the program 25061, to perform the following operations:

receiving, by using the network interface 2505, bearer-less handover indication information sent by user equipment UE when the UE performs a handover from a first base station to a second base station, where the UE performs communication at the first base station by using a first packet data unit PDU connection via a first forwarding plane network element, and the bearer-less handover indication information is used to instruct the second base station not to establish a connection to the first forwarding plane network element; and determining, according to the bearer-less handover indication information, not to establish the connection to the first forwarding plane network element.

It should be noted that the base station may be specifically the base station in the foregoing embodiment, and may be configured to perform the steps and/or procedures corresponding to the base station in the foregoing method embodiment.

It can be learned from the foregoing technical solution provided in this embodiment of this application that, the second base station receives the bearer-less handover indication information sent by the UE, and determines, according to the bearer-less handover indication information, not to establish the connection to the first forwarding plane network element, so that a handover delay of a service flow and a requirement on network deployment are reduced.

The base station 2500 in this embodiment of this application may correspond to the second base station in the communication method in the embodiment of this application, and the foregoing and other operations and/or functions of the modules in the base station 2500 are separately intended for implementing corresponding procedures in the foregoing methods. For brevity, details are not described herein again.

Figure 27:
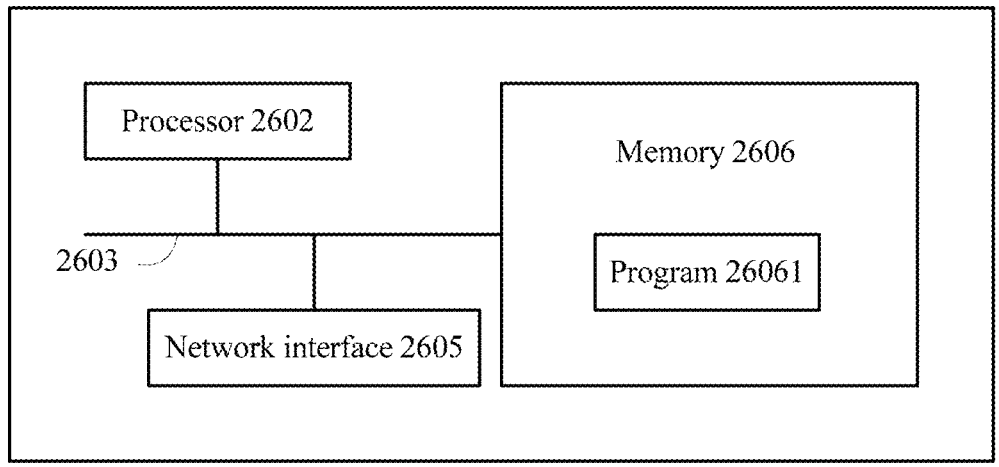
FIG. 27 is a schematic structural diagram of user equipment according to another embodiment of this application.

FIG. 27 shows a structure of UE according to still another embodiment of this application. The UE includes at least one processor 2602 (such as a general purpose processor CPU having computing and processing capabilities, a DSP, an ASIC, or a FPGA). The processor manages and schedules modules and devices in the user equipment. The UE further includes at least one network interface 2605 or another communications interface, a memory 2606, and at least one bus system 2603. Components of the user equipment are coupled together by using the bus system 2603. The bus system 2603 may include a data bus, a power bus, a control bus, a signal status bus, and the like. However, for clear description, all the buses in the figure are marked as the bus system 2603.

The method disclosed in the embodiment of this application may be applied to the processor 2602, or is used to execute an executable module stored in the memory 2606, for example, a computer program. The memory 2606 may include a high speed RAM, or may include a non-volatile memory. The memory may include a read-only memory and a random access memory, and provide required signaling or data, a required program, and the like for the processor. A part of the memory may further include a NVRAM. A communication connection to at least one another network element is implemented by using the at least one network interface 2605 (which may be wired or wireless).

In some implementations, the memory 2606 stores a program 26061, and the processor 2602 executes the program 26061, to perform the following operations:

obtaining, by using the network interface 2605, an identity ID of a second base station from a first base station, where the second base station is a base station to which the UE prepares to perform a handover from the first base station; and sending, by using the network interface 2605, a connection request message to a control plane network element, where the connection request message carries the identity ID of the second base station, so that the control plane network element establishes a PDU connection based on the identity ID of the second base station, the PDU connection is a connection between the UE and a second forwarding plane network element, and the second forwarding plane network element is selected by the control plane network element based on the identity ID of the second base station.

It should be noted that the user equipment may be specifically the user equipment in the foregoing embodiment, and may be configured to perform the steps and/or procedures corresponding to the user equipment in the foregoing method embodiment.

It can be learned from the foregoing technical solution provided in this embodiment of this application that, when the UE needs to move, the UE obtains the identity ID of the second base station in advance, and sends the ID of the second base station to the control plane network element, so that the control plane network element selects the second forwarding plane network element based on the ID of the second base station, and the PDU connection is established between the UE and the second forwarding plane network element. This avoids a connection established by the UE by using the second base station and a first forwarding plane network element in a handover process, so that a handover delay of a service flow and a requirement on network deployment are reduced.

The UE 2600 in this embodiment of this application may correspond to the user equipment in the communication method in the embodiment of this application, and the foregoing and other operations and/or functions of the modules in the UE 2600 are separately intended for implementing corresponding procedures in the foregoing methods. For brevity, details are not described herein again.

Figure 28:
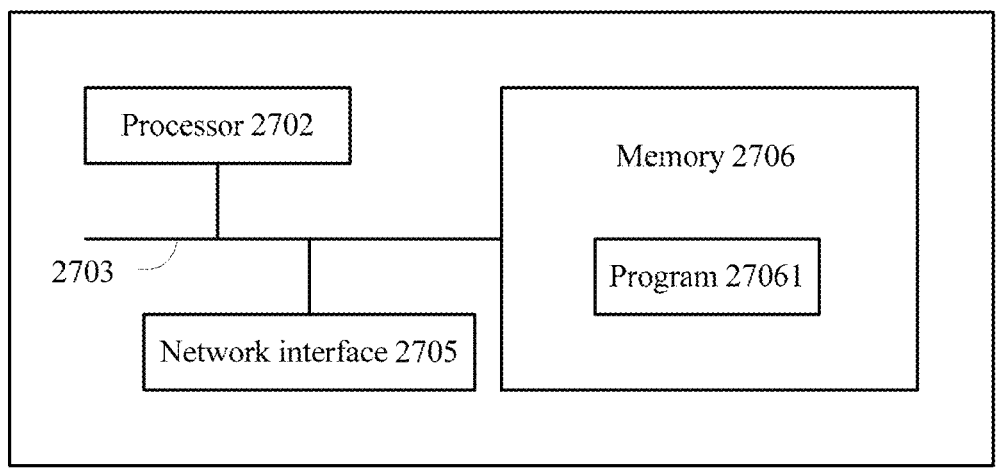
FIG. 28 is a schematic structural diagram of a control plane network element according to another embodiment of this application.

FIG. 28 shows a structure of a control plane network element according to another embodiment of this application. The control plane network element includes at least one processor 2702 (such as a general purpose processor CPU having computing and processing capabilities, a DSP, an ASIC, or a FPGA). The control plane network element further includes at least one network interface 2705 or another communications interface, a memory 2706, and at least one bus system 2703. Components of the control plane network element are coupled together by using the bus system 2703. The bus system 2703 may include a data bus, a power bus, a control bus, a signal status bus, and the like. However, for clear description, all the buses in the figure are marked as the bus system 2703.

The method disclosed in the embodiment of this application may be applied to the processor 2702, or is used to execute an executable module stored in the memory 2706, for example, a computer program. The memory 2706 may include a high speed RAM, or may include a non-volatile memory. The memory may include a read-only memory and a random access memory, and provide required signaling or data, a required program, and the like for the processor. A part of the memory may further include a NVRAM. A communication connection to at least one another network element is implemented by using the at least one network interface 2705 (which may be wired or wireless).

In some implementations, the memory 2706 stores a program 27061, and the processor 2702 executes the program 27061, to perform the following operations:

receiving, by using the network interface 2705, a packet data unit PDU connection request message sent by user equipment UE, where the PDU connection request message carries an identity ID of a second base station, and the second base station is a base station to which the UE prepares to perform a handover from a currently accessed first base station; and establishing a PDU connection based on the identity ID of the second base station, where the PDU connection is a connection between the UE and a second forwarding plane network element, and the second forwarding plane network element is selected based on the identity ID of the second base station.

It should be noted that the control plane network element may be specifically the control plane network element in the foregoing embodiment, and may be configured to perform the steps and/or procedures corresponding to the control plane network element in the foregoing method embodiment.

It can be learned from the foregoing technical solution provided in this embodiment of this application that, the control plane network element receives the identity ID of the second base station sent by the UE, selects the second forwarding plane network element based on the ID of the second base station, and establishes the PDU connection between the UE and the second forwarding plane network element. This avoids a connection established by the UE by using the second base station and the first forwarding plane network element in a handover process, so that a handover delay of a service flow and a requirement on network deployment are reduced.

The control plane network element 2700 in this embodiment of this application may correspond to the control plane network element in the communication method in the embodiment of this application, and the foregoing and other operations and/or functions of the modules in the control plane network element 2700 are separately intended for implementing corresponding procedures in the foregoing methods. For brevity, details are not described herein again.

An embodiment of this application further provides a computer storage medium, where the computer storage medium may store a program instruction used to indicate any one of the foregoing methods.

Optionally, the storage medium may be specifically any one of the memory 2406, the memory 2506, the memory 2606, and the memory 2706.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or some of the technical solutions may be implemented in a form of a software product. The software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
performing, by a user equipment (UE), a handover from a first base station to a second base station, wherein the UE performs communication at the first base station by using a first packet data unit (PDU) connection via a first forwarding plane network element; and
in response to receiving an uplink resource configuration message from the second base station, sending, by the UE, a connection reconfiguration complete message to the second base station when performing the handover, wherein the connection reconfiguration complete message carries a bearer-less handover indication information, and wherein the bearer-less handover indication information is used to instruct the second base station not to establish a connection to the first forwarding plane network element.

2. The communication method according to claim 1, wherein the communication method further comprises:
after accessing the second base station, establishing, by the UE, a second PDU connection by using the second base station and a second forwarding plane network element, wherein the second forwarding plane network element is a gateway corresponding to the second base station; and
performing, by the UE, communication by using the second PDU connection.

3. The communication method according to claim 2, wherein after performing the communication by using the second PDU connection, the communication method further comprises:
releasing, by the UE, the first PDU connection when a preset time threshold is reached.

4. An apparatus, comprising:
an interface;
at least one processor; and
a non-transitory computer-readable storage medium storing a program to be executed by the at least one processor, the program including instructions that, when executed, cause user equipment (UE) to:
perform a handover from a first base station to a second base station, wherein the UE performs communication at the first base station by using a first packet data unit (PDU) connection via a first forwarding plane network element; and
in response to receiving an uplink resource configuration message from the second base station, send, using the interface, a connection reconfiguration complete message to the second base station when performing the handover, wherein the connection reconfiguration complete message carries a bearer-less handover indication information, and wherein the bearer-less handover indication information is used to instruct the second base station not to establish a connection to the first forwarding plane network element.

5. The apparatus according to claim 4, wherein the program further includes instructions to cause the UE to:
establish, after the UE accesses the second base station, a second PDU connection by using the second base station and a second forwarding plane network element, wherein the second forwarding plane network element is a gateway corresponding to the second base station; and
perform communication by using the second PDU connection.

6. The apparatus according to claim 5, wherein the program further includes instructions to cause the UE to, after performing communication by using the second PDU connection, release the first PDU connection when a preset time threshold is reached.

7. The apparatus according to claim 4, wherein the apparatus is the UE.

8. A non-transitory computer-readable medium storing computer instructions for execution by one or more processors, wherein the computer instructions instruct the one or more processors to perform the operations of:
performing a handover from a first base station to a second base station, wherein a user equipment (UE) performs communication at the first base station by using a first packet data unit (PDU) connection via a first forwarding plane network element; and
in response to receiving an uplink resource configuration message from the second base station, sending a connection reconfiguration complete message to the second base station when performing the handover, wherein the connection reconfiguration complete message carries a bearer-less handover indication information, and wherein the bearer-less handover indication information is used to instruct the second base station not to establish a connection to the first forwarding plane network element.

9. The computer-readable medium of claim 8, wherein the computer instructions instruct the one or more processors to perform the operations of:
after accessing the second base station, establishing a second PDU connection by using the second base station and a second forwarding plane network element, wherein the second forwarding plane network element is a gateway corresponding to the second base station; and
performing communication by using the second PDU connection.

10. The computer-readable medium of claim 9, wherein after performing the communication by using the second PDU connection, the computer instructions instruct the one or more processors to perform the operations of:
releasing the first PDU connection when a preset time threshold is reached.

* * * * *